(12) United States Patent
Yearicks et al.

(10) Patent No.: US 12,111,124 B1
(45) Date of Patent: Oct. 8, 2024

(54) PIVOT PIN WITH INSTALLATION APERTURE

(71) Applicant: Aero Precision, LLC, Tacoma, WA (US)

(72) Inventors: Dustin Yearicks, SeaTac, WA (US); Kirk Foreman, Gig Harbor, WA (US)

(73) Assignee: Aero Precision, LLC, Tacoma, WA (US)

( * ) Notice: Subject to any disclaimer, the term of this patent is extended or adjusted under 35 U.S.C. 154(b) by 0 days.

(21) Appl. No.: 18/093,973

(22) Filed: Jan. 6, 2023

(51) Int. Cl.
*F41A 11/00* (2006.01)
*F16B 21/12* (2006.01)
*F41A 3/66* (2006.01)

(52) U.S. Cl.
CPC ............ *F41A 11/00* (2013.01); *F16B 21/125* (2013.01); *F41A 3/66* (2013.01)

(58) Field of Classification Search
None
See application file for complete search history.

(56) References Cited

U.S. PATENT DOCUMENTS

| | | |
|---|---|---|
| 7,937,876 B1 | 5/2011 | Graham |
| 9,151,555 B1 | 10/2015 | Huang |
| 9,389,031 B2 | 7/2016 | Gardner |
| 9,400,006 B1 | 7/2016 | Huang et al. |
| 11,112,197 B2 * | 9/2021 | Underwood ............ F41A 11/00 |
| 2017/0016690 A1 * | 1/2017 | Timmons .................. F41A 3/66 |

* cited by examiner

*Primary Examiner* — Reginald S Tillman, Jr.
(74) *Attorney, Agent, or Firm* — Bamert Regan PLLC; John J. Bamert, Esq.; Raymond Armentrout, Esq.

(57) ABSTRACT

Embodiments are directed toward a pivot pin for a coupling an upper receiver of a firearm to a lower receiver of the firearm. In some embodiments, the pivot pin includes a head and a shaft that extends from the head. In some embodiments, the shaft defines a detent-retention channel and an installation aperture opposite the channel from the head. In some embodiments, the channel is configured to receive a detent and to enable the pivot pin to slide between a locked configuration and an unlocked configuration. In some embodiments, the installation aperture is configured to receive a tool that extends through the shaft, thereby urging the detent into a detent recess in the lower receiver while the shaft covers the detent recess in the lower receiver. Accordingly, the installation aperture facilitates reducing the likelihood that the detent escapes from the detent recess during installation of the pivot pin.

19 Claims, 40 Drawing Sheets

PIVOT PIN WITH INSTALLATION APERTURE

FIELD OF THE INVENTION

The invention relates generally to pins and, more particularly, to pivot pins for AR-pattern firearms.

BACKGROUND OF THE INVENTION

Firearms such as AR-pattern firearms (e.g., the AR-10 or the AR-15) often have a takedown pin and a pivot pin that selectively couple an upper receiver to a lower receiver. Each pin defines a channel along the length the pin, and a spring-biased, retention detent received in the channel retains the pin in the lower receiver while permitting the pin to slide between a locked configuration and an unlocked configuration. In the locked configuration, the pins couple the upper receiver to the lower receiver. In the unlocked configuration, the pins enable separating the upper receiver and the lower receiver from each other. The pins therefore enable simple assembly and disassembly of the firearm. However, installing the pivot pin in the front end portion of the lower receiver is especially challenging because the pivot pin retains the detent in the lower receiver while the retention detent is spring loaded, which leaves the detent susceptible to falling out of place or being expelled from the lower receiver during installation of the pivot pin. This challenge is a longstanding problem that many in the field of firearms have attempted to solve. Most attempts at solutions involve specialized tools that users are unlikely have with them outside of a workshop, eliminating helpfulness of such tools when problems arise in the outdoors that require disassembly and reassembly of the firearm or replacement of the pivot pin.

As explained in U.S. Pat. No. 9,400,006 issued to Huang et al. ("Huang") (e.g., column 2, lines 55-59), it is generally believed that it is impossible to use separate tools or other devices to aid in the installation of the pivot pin. Instead, some pivot pins (such as those disclosed by Huang) have a recess separate from the channel, and the recess is configured to temporarily stabilize the detent while the pivot pin is used to press the detent into the lower receiver, thereby simplifying installation of the pivot pin. Such recess fails, however, to provide significant control over the orientation of the detent while the pivot pin compresses the spring, thereby leaving the pivot pin susceptible to escaping the recess and thereafter falling out of place or being expelled from the lower receiver. Accordingly, the challenges of installing pivot pins remain, regardless of whether pivot pins have stabilizing recesses.

Moreover, transitioning the detent from the recess in the pivot pin to the channel requires applying sufficient force to the pivot pin to cause the detent to jump out of the recess, which causes the pivot pin to suddenly move and thereby increases the likelihood that a mistake is made during installation such that the detent falls out of place or is expelled from the lower receiver. In particular, the force applied to the pivot pin must be in a direction parallel to the longitudinal axis of the pivot pin and transverse to the longitudinal axis of the detent, and such force must be of sufficient magnitude to overcome the spring bias and thereby translate the detent along the direction of its longitudinal axis into the lower receiver until the detent escapes the recess. Accordingly, the pivot pin disclosed by Huang presents additional challenges.

For these reasons, there is a need for a pivot pin that simplifies installation. There is also a need for a pivot pin that facilitates installation with a reduced pressing force on the pivot pin. There is a further need for a pivot pin that facilitates installation with a reduced likelihood that the detent falls out of place or ejects from the lower receiver during installation of the pivot pin.

SUMMARY OF THE INVENTION

It is therefore an object of the present invention to provide pivot pins that facilitate simplified installation of the pivot pins.

It is also an object of the present invention to provide pivot pins that achieve the above object and that also stabilize retention detents during installation of the pivot pins while enabling reduction of force applied to the pivot pins during installation.

It is another object of the present invention to provide pivot pins that achieve the above objects and that also enable the use of common tools to simplify installation of the pivot pins.

The invention achieves the above objects, as well as other objects and advantages that will become apparent from the description that follows, by providing a pivot pin for a coupling an upper receiver of a firearm to a lower receiver of the firearm. In some embodiments, the pivot pin has a head and a shaft that extends from the head. In some embodiments, the shaft defines a detent-retention channel that extends along the shaft and an installation aperture opposite the channel from the head. In some embodiments, the channel is configured to receive a spring-biased detent and to enable the pivot pin to slide relative to the detent in the channel between a locked configuration and an unlocked configuration. In some embodiments, the installation aperture is configured to receive a tool that extends through the shaft and to enable the detent to be urged by the tool into a detent recess in the lower receiver while the shaft covers the detent recess in the lower receiver and while the tool extends through the shaft. Accordingly, the installation aperture in the shaft facilitates reducing a likelihood that the detent escapes from the detent recess in the lower receiver during installation of the pivot pin in the lower receiver.

In some embodiments, the installation aperture has an inner diameter that is at least as large as an outer diameter of the detent. In some embodiments, the installation aperture is configured to enable insertion of the detent into the detent recess in the lower receiver while the pivot pin covers the detent recess in the lower receiver by inserting the detent through the installation aperture in the shaft of the pivot pin. Accordingly, in some embodiments, the installation aperture facilitates installation of the pivot pin in the lower receiver without using the pivot pin to overcome a bias of a spring in the detent recess in the lower receiver.

In some embodiments, the installation aperture has an inner diameter that is smaller than an outer diameter of the detent. In some embodiments, the installation aperture has a retention portion with a diameter at least as great as the outer diameter of the detent. In some embodiments, the retention portion is configured to retain the detent in the installation aperture while the pivot pin covers the detent recess in the lower receiver until the tool urges the detent into the detent recess in the lower receiver. Accordingly, in some embodiments, the installation aperture in the shaft facilitates increased control over the detent during installation of the pivot pin.

In some embodiments, the channel has a proximate end portion proximate to the head and a distal end portion distal to the head. In some embodiments, the shaft defines a removal aperture in the distal end portion of the channel. In some embodiments, the removal aperture is configured to receive the tool that extends through the shaft to urged the detent out of the channel while the tool extends through the shaft. In some embodiments, the removal aperture has an inner diameter that is smaller than an outer diameter of the detent. Accordingly, in some embodiments, the removal aperture facilitates preventing the detent from escaping the channel until the tool is inserted through the removal aperture.

In some embodiments, the installation aperture has an inner diameter that is greater than the inner diameter of the removal aperture. In other embodiments, the installation aperture has an inner diameter that is substantially the same as the inner diameter of the removal aperture.

In some embodiments, the shaft defines a main floor of the channel and a ramp coupled to the main floor of the channel and to the removal aperture. In some embodiments, the main floor of the channel extends from the proximate end portion of the channel to the distal end portion of the channel. Accordingly, in some embodiments, the ramp facilitates transitioning the pivot pin relative to the detent from the unlocked configuration to the locked configuration with reduced force applied to the pivot pin. In some embodiments, the pivot pin defines a detent-retention recess in the proximate end portion of the channel and a ramp coupled to the main floor of the channel and to the detent-retention recess. Accordingly, in some embodiments, the ramp facilitates transitioning the pivot pin relative to the detent from the locked configuration to the unlocked configuration with reduced force applied to the pivot pin.

The invention also achieves the above objects, as well as other objects and advantages that will become apparent from the description that follows, by providing a pin. In some embodiments, the pin has a head and a shaft that extends from the head. In some embodiments, the shaft defines a detent-retention channel that extends along the shaft. In some embodiments, the shaft defines an installation aperture opposite the channel from the head. In some embodiments, the channel is configured to receive a detent and to enable the pin to slide relative to the detent in the channel between a locked configuration and an unlocked configuration. In some embodiments, the installation aperture extends entirely through the shaft. Accordingly, the installation aperture in the shaft facilitates simplifying installation of the pin.

In some embodiments, the installation aperture has an inner diameter that is at least as large as an outer diameter of the detent. In some embodiments, the installation aperture is configured to enable insertion of the detent through the installation aperture in the shaft. Accordingly, in some embodiments, the installation aperture facilitates insertion of the detent into a recess by inserting the detent through the installation aperture.

In some embodiments, the installation aperture has an inner diameter that is smaller than an outer diameter of the detent and at least as large as an outer diameter of a tool. Accordingly, in some embodiments, the installation aperture facilitates urging the detent into a recess by inserting the tool through the installation aperture. In some embodiments, the installation aperture has a retention portion with a diameter at least as great as the outer diameter of the detent. In some embodiments, the retention portion is configured to retain the detent in the installation aperture while the pin covers the recess until the tool urges the detent into the recess. Accordingly, in some embodiments, the installation aperture in the shaft facilitates increased control over the detent.

In some embodiments, the channel has a proximate end portion proximate to the head and a distal end portion distal to the head. In some embodiments, the shaft defines a removal aperture in the distal end portion of the channel. In some embodiments, the removal aperture is configured to receive a tool that extends through the shaft to urge the detent out of the channel. In some embodiments, the removal aperture has an inner diameter that is smaller than an outer diameter of the detent. Accordingly, in some embodiments, the removal aperture facilitates preventing the detent from escaping the channel until the tool is inserted through the removal aperture.

In some embodiments, the installation aperture has an inner diameter that is greater than the inner diameter of the removal aperture. In other embodiments, the installation aperture has an inner diameter that is substantially the same as the inner diameter of the removal aperture.

In some embodiments, the shaft defines a main floor of the channel and a ramp coupled to the main floor of the channel and to the removal aperture. In some embodiments, the main floor of the channel extends from the proximate end portion of the channel to the distal end portion of the channel. Accordingly, in some embodiments, the ramp facilitates transitioning the pin relative to the detent from the unlocked configuration to the locked configuration with reduced force applied to the pin.

The also invention achieves the above objects, as well as other objects and advantages that will become apparent from the description that follows, by providing a method of installing a pivot pin in a lower receiver of a firearm. The pivot pin is held against the front end portion of the lower receiver so as to cover a detent recess in the lower receiver. A detent is then urged into the detent recess in the lower receiver by inserting a tool through the installation aperture in the shaft of the pivot pin. Next, the pivot pin is slid in a pin aperture defined by the lower receiver. Accordingly, urging the detent into the detent recess in the lower receiver with the tool inserted through the installation aperture in the shaft of the pivot pin facilitates reducing a likelihood that the detent escapes from the detent recess in the lower receiver.

In some embodiments, while the pivot pin covers the detent recess in the lower receiver, the detent is inserted through the installation aperture in the shaft of the pivot pin toward the detent recess in the lower receiver. Accordingly, in some embodiments, the pivot pin is installed in the lower receiver without using the pivot pin to overcome a bias of a spring in the detent recess in the lower receiver.

In some embodiments, the detent is temporarily held in a retention portion of the installation aperture while the pivot pin covers the detent recess in the lower receiver. Next, in some embodiments, the detent is urged out of the retention portion of the installation aperture into the detent recess in the lower receiver by inserting the tool through the installation aperture in the shaft of the pivot pin. Accordingly, in some embodiments, the installation aperture in the shaft of the pivot pin facilitates increased control over the detent during installation of the pivot pin.

BRIEF DESCRIPTION OF THE DRAWINGS

Preferred and alternative embodiments of the present invention are described in detail below with reference to the following drawings.

Figure 1:
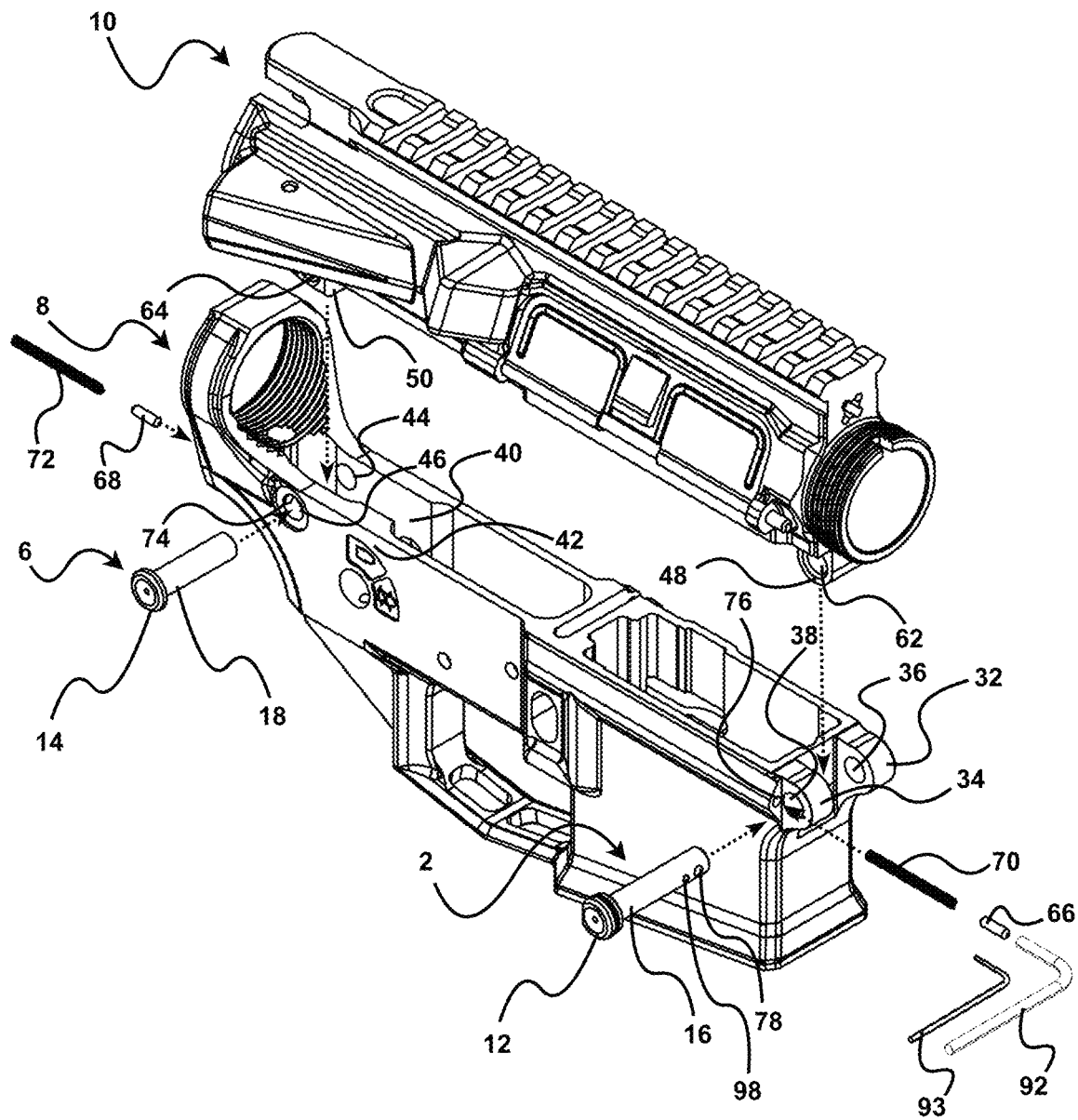
FIG. 1 is an isometric exploded view of an upper receiver, lower receiver, takedown pin, a first embodiment of a pivot pin, springs, retention detents, and tools according to the principles of the present invention.
Figure 8:
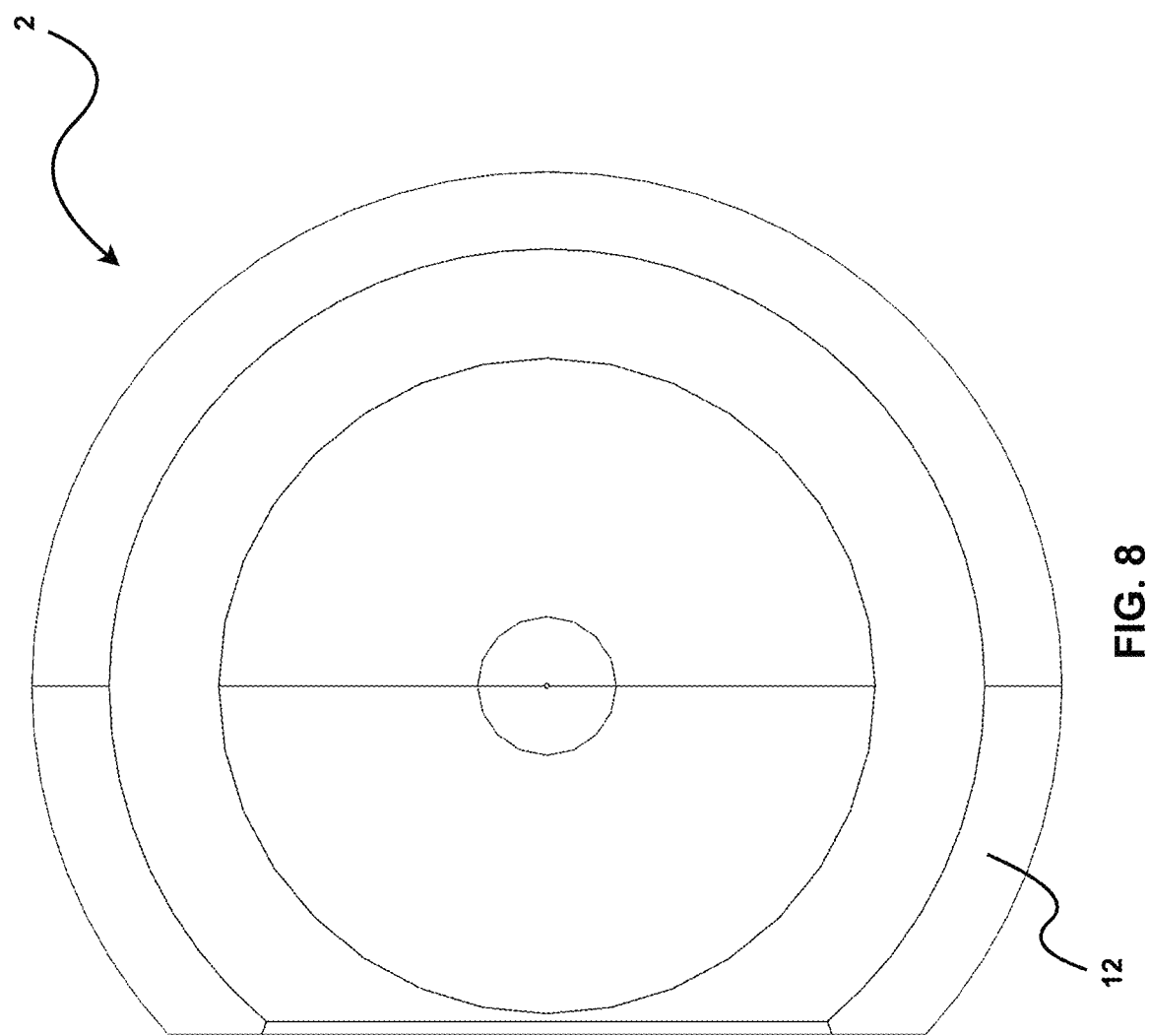
FIG. 8 is an elevational right side view of the pivot pin of FIG. 1.
Figure 9:
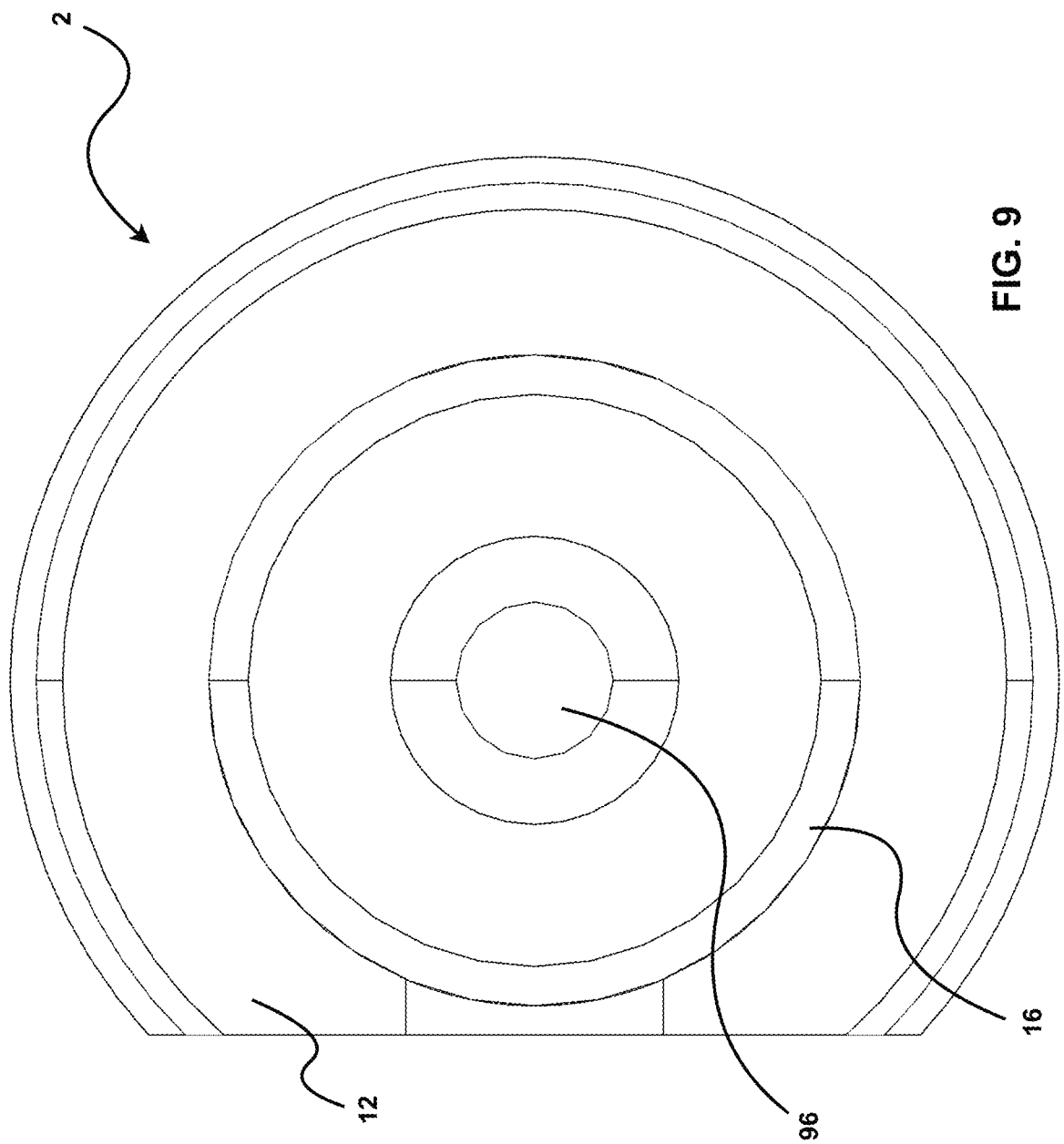
FIG. 9 is an elevational left side view of the pivot pin of FIG. 1.
Figure 10:
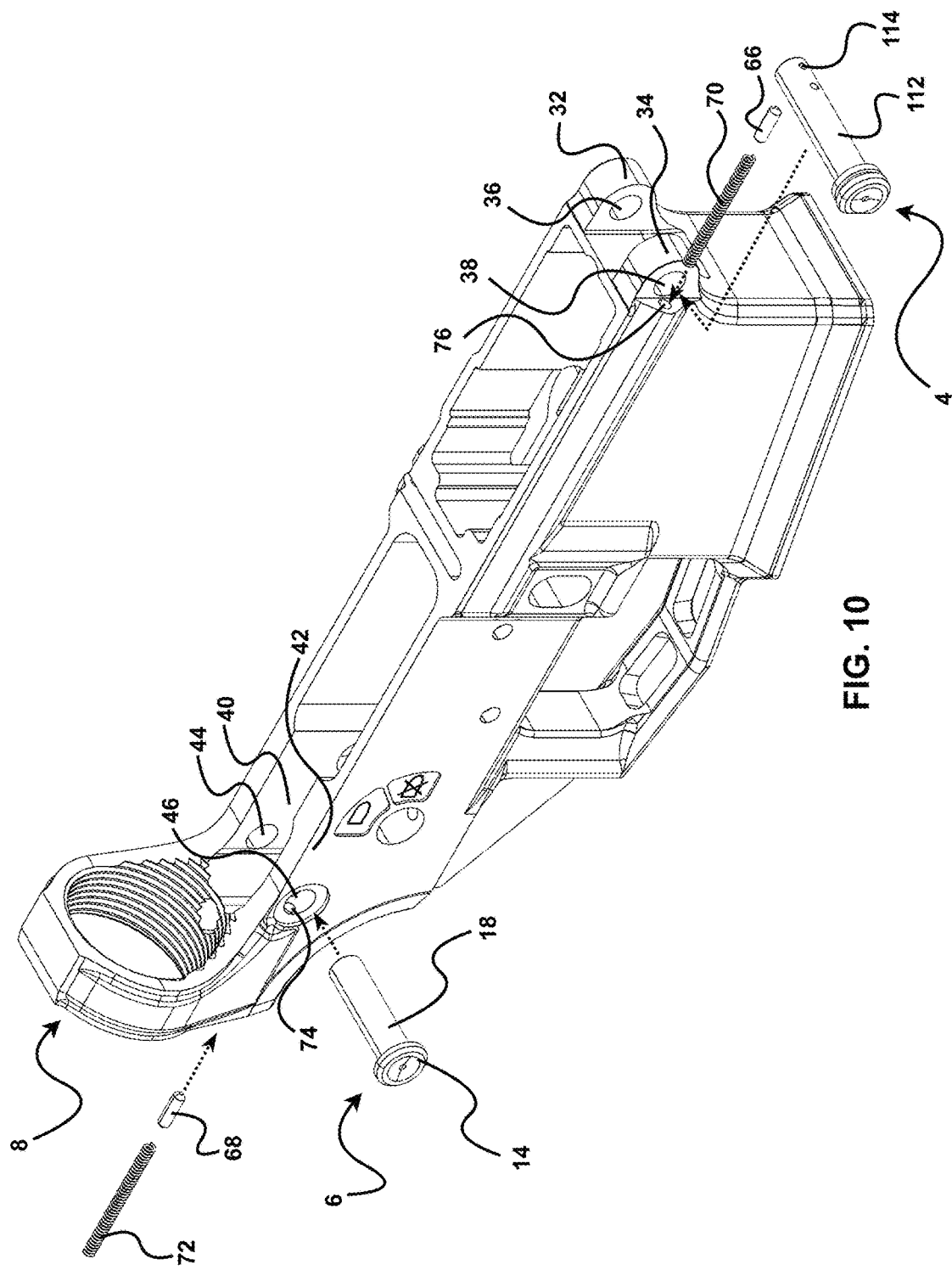
FIG. 10 is an isometric exploded view of the lower receiver, the takedown pin, a second embodiment of a pivot pin, the springs, and the retention detents according to the principles of the present invention.
Figure 11:
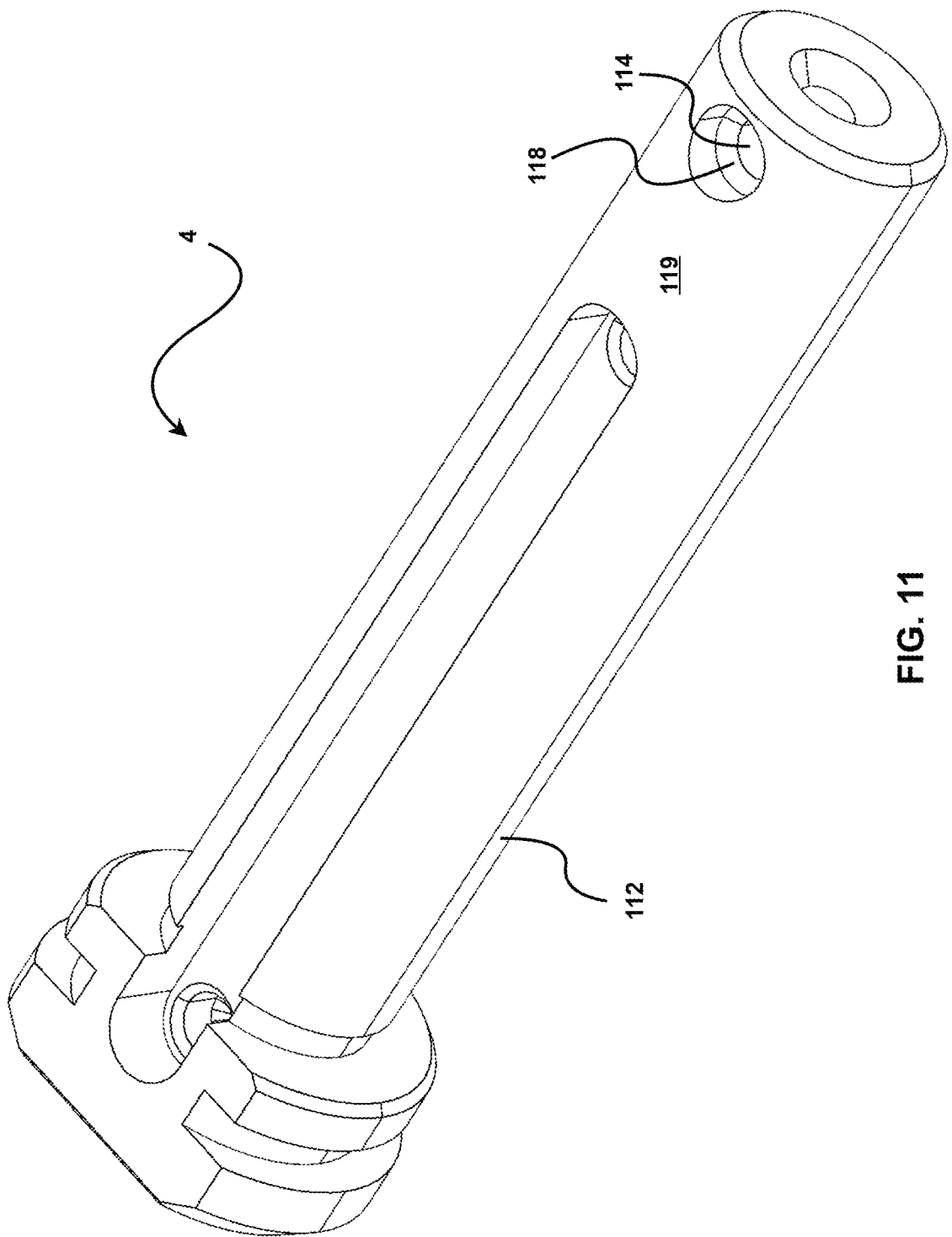
FIG. 11 is an isometric perspective rear view of the pivot pin of FIG. 10.
Figure 12:
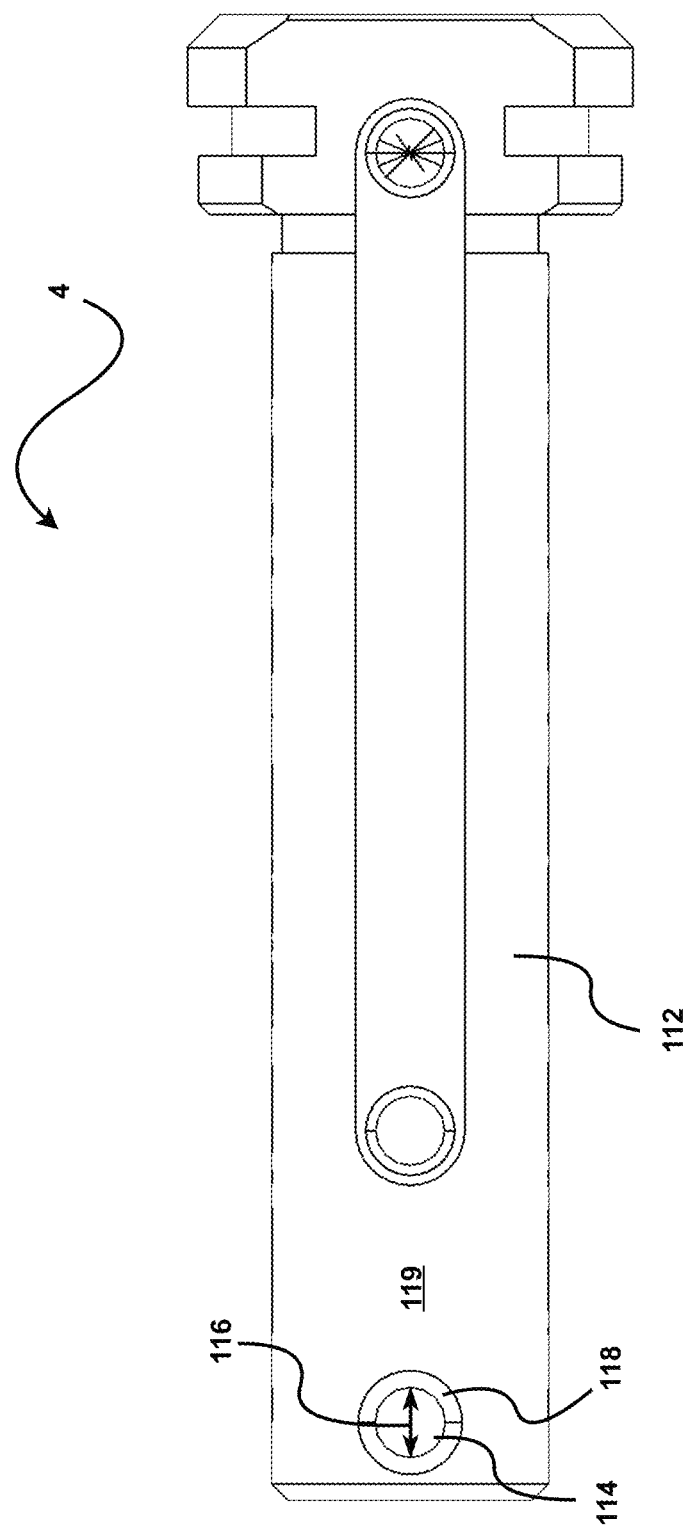
FIG. 12 is a rear elevational view of the pivot pin of FIG. 10.
Figure 13:
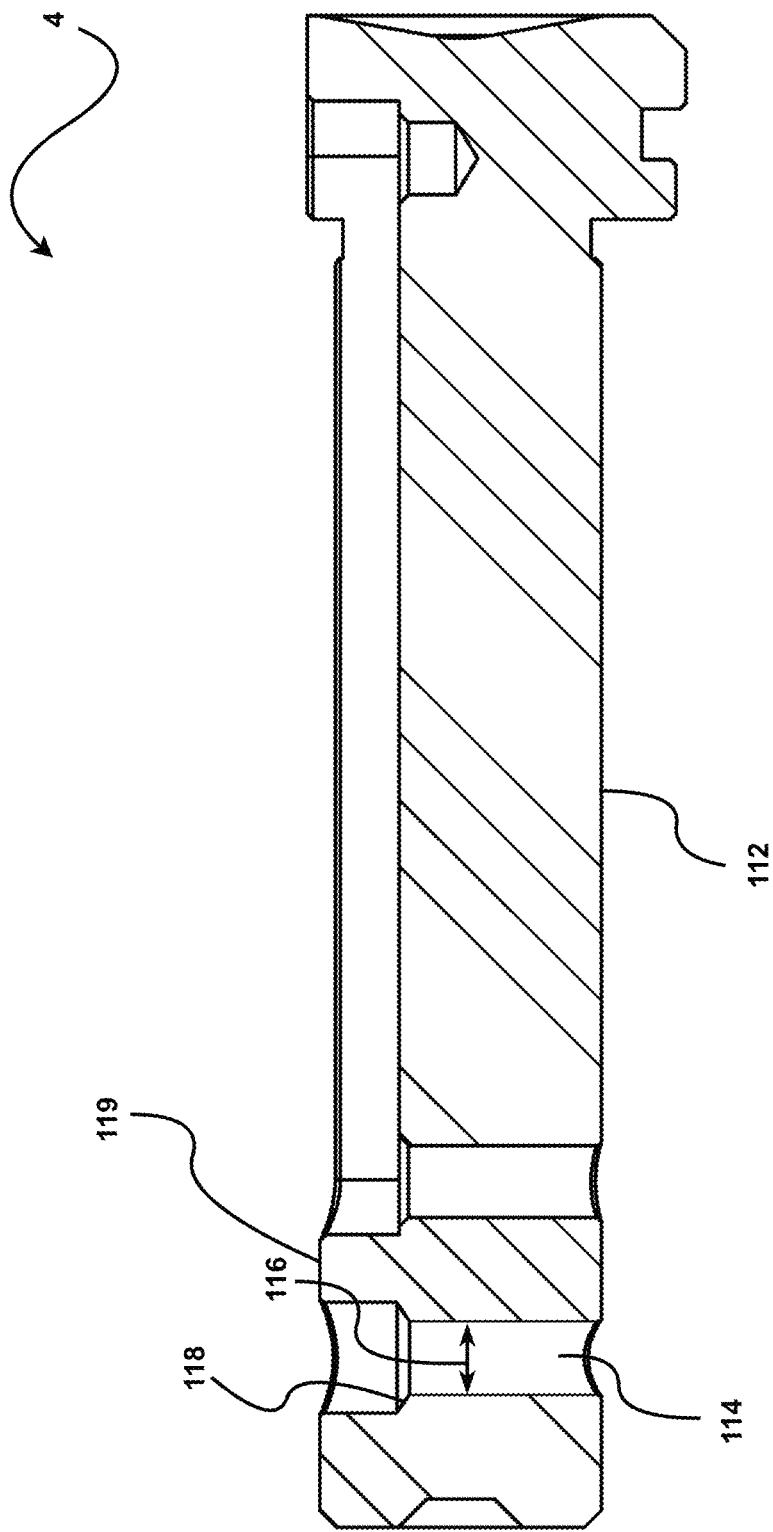
FIG. 13 is a cross-sectional view of the pivot pin of FIG. 10, taken along line 13-13 in FIG. 12.
Figure 14:
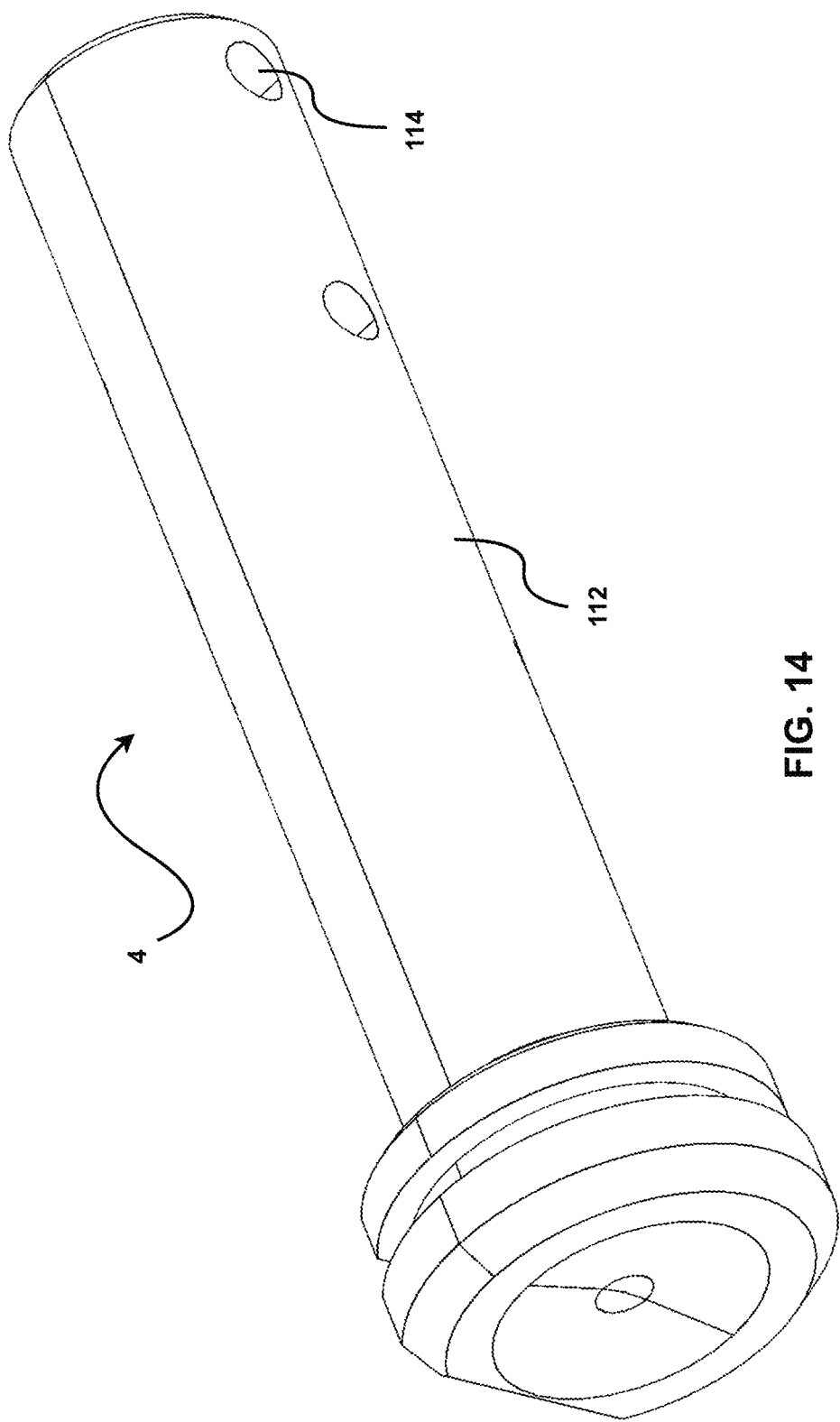
FIG. 14 is an isometric perspective front view of the pivot pin of FIG. 10.
Figure 15:
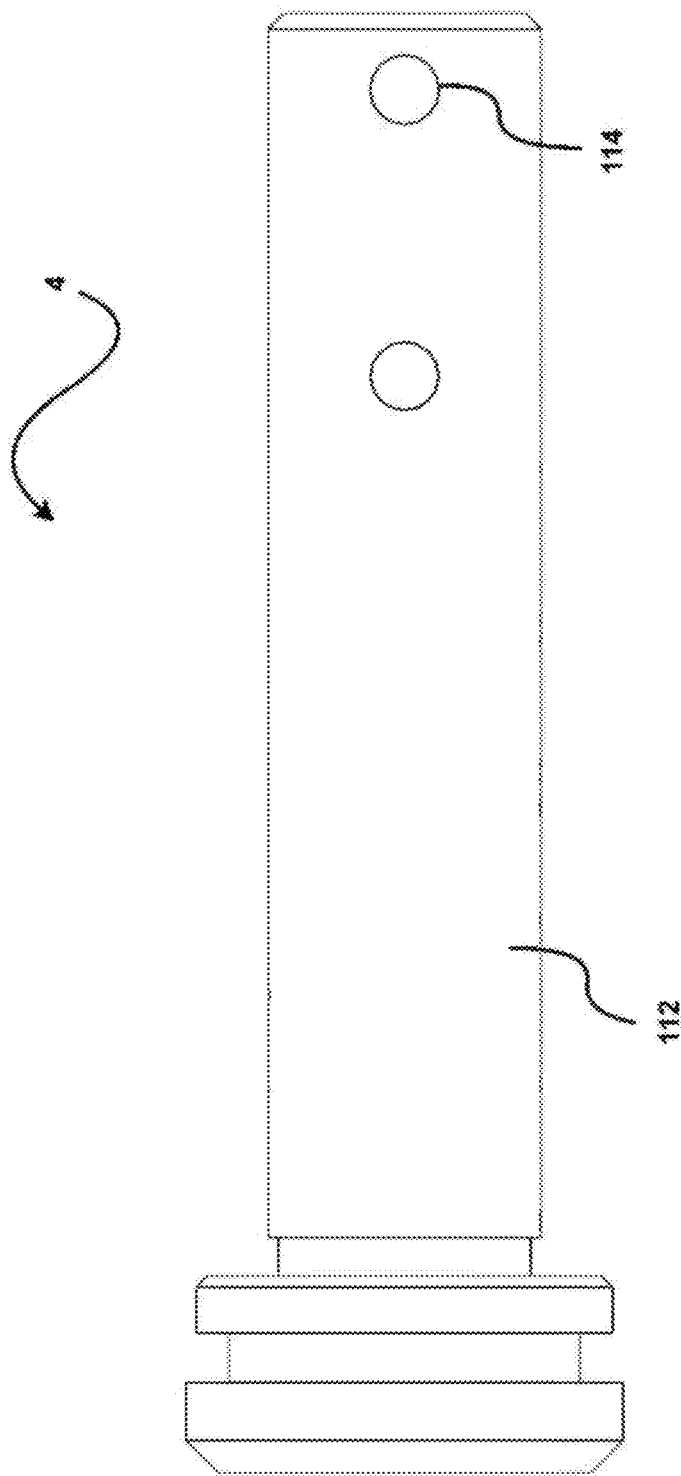
FIG. 15 is a front elevational view of the pivot pin of FIG. 10.
Figure 16:
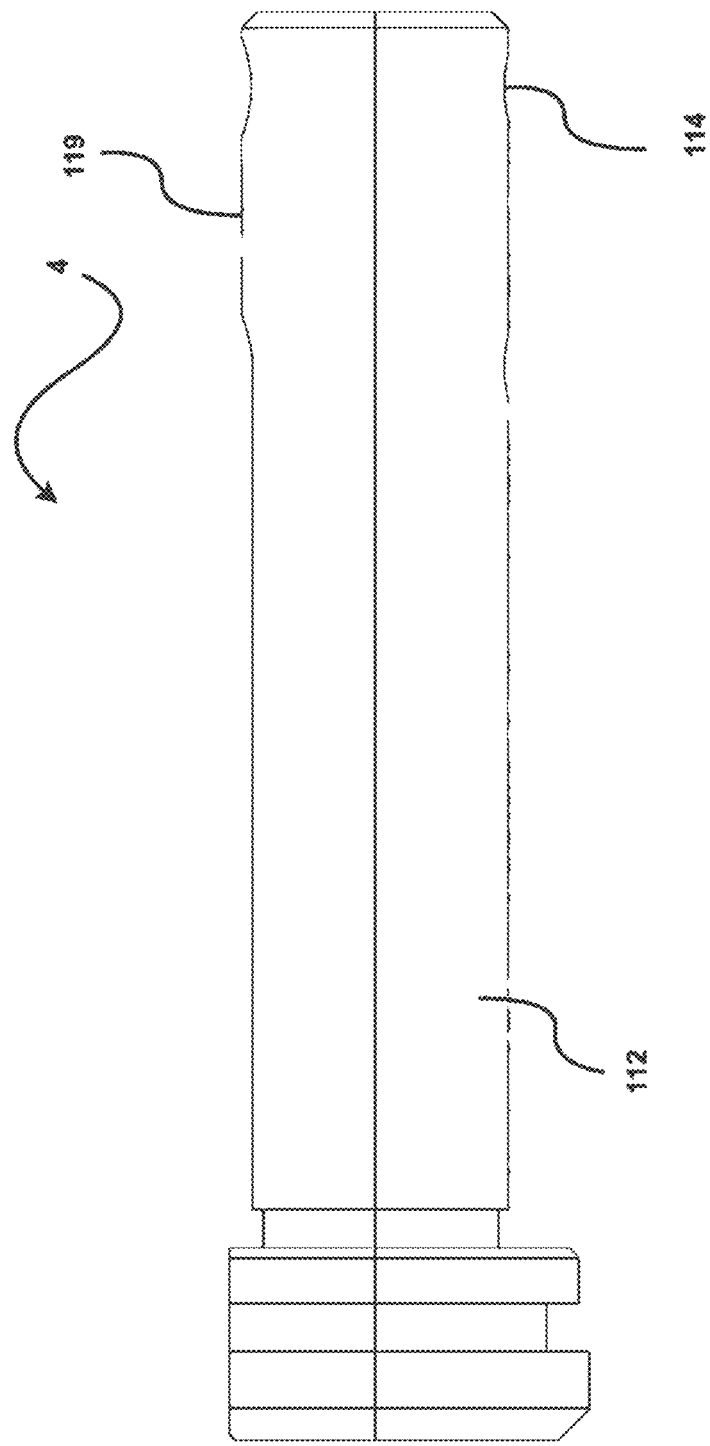
FIG. 16 is an overhead view of the pivot pin of FIG. 10, the bottom view being a mirror image thereof.
Figure 17:
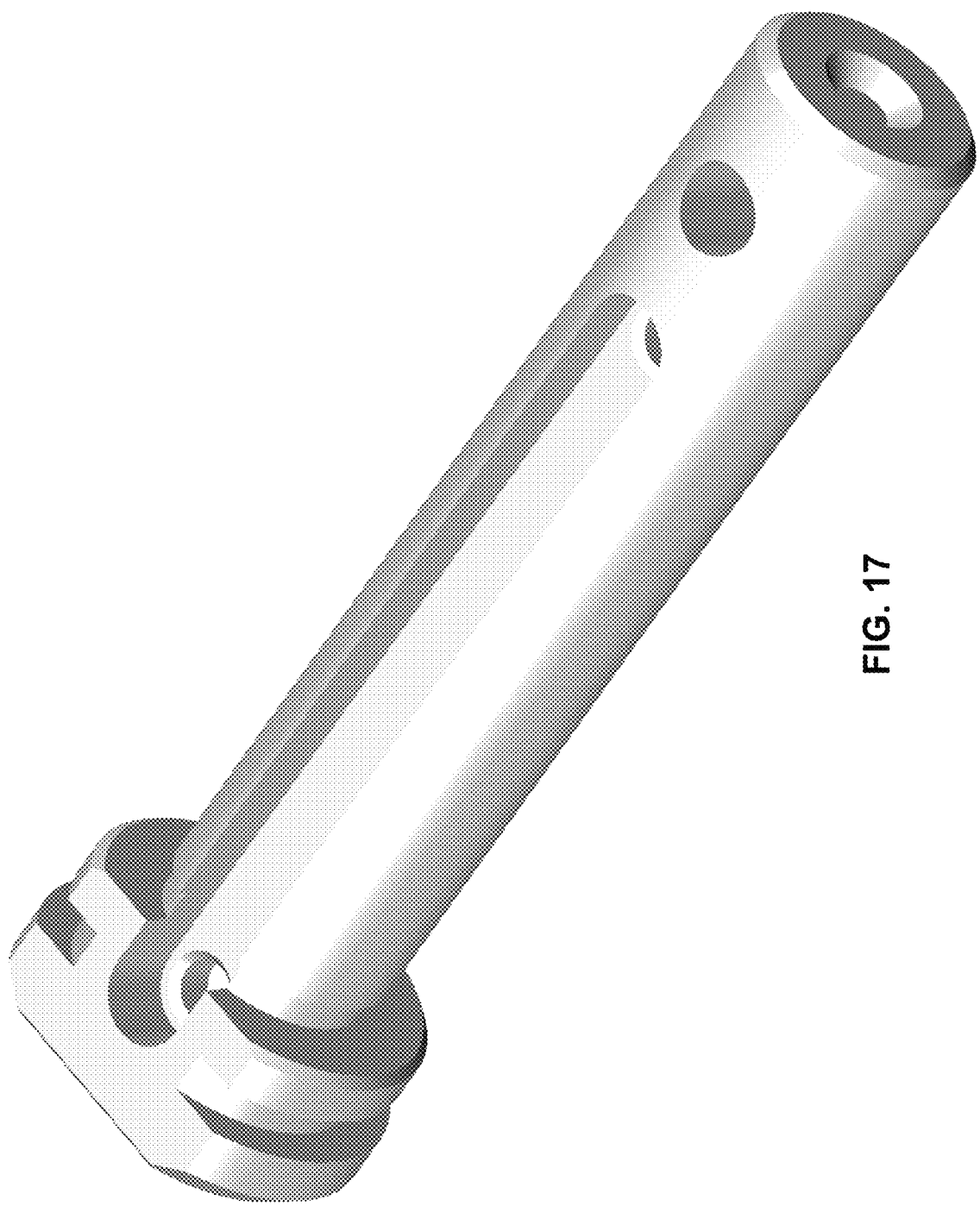
Figure 18:
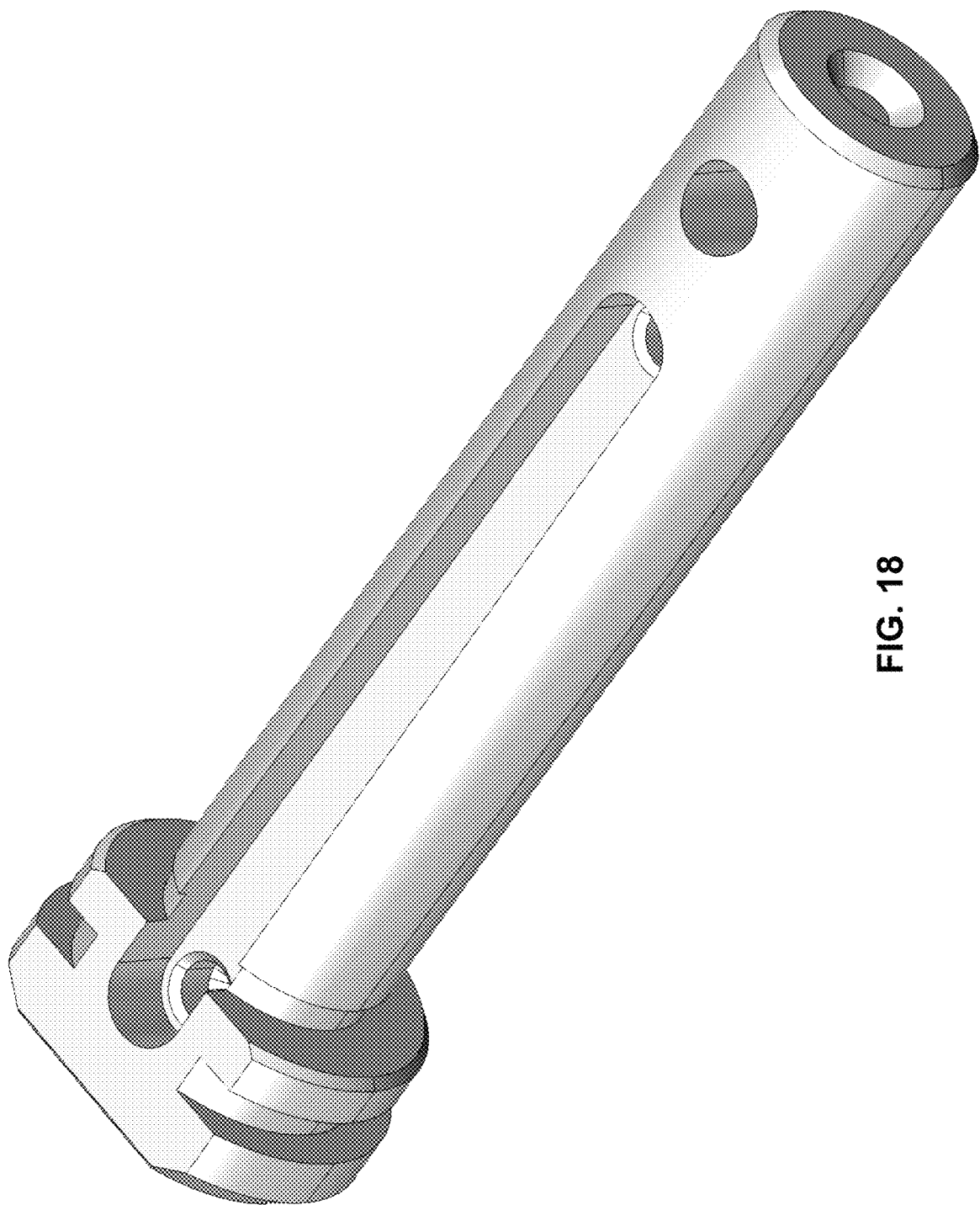
Figure 19:
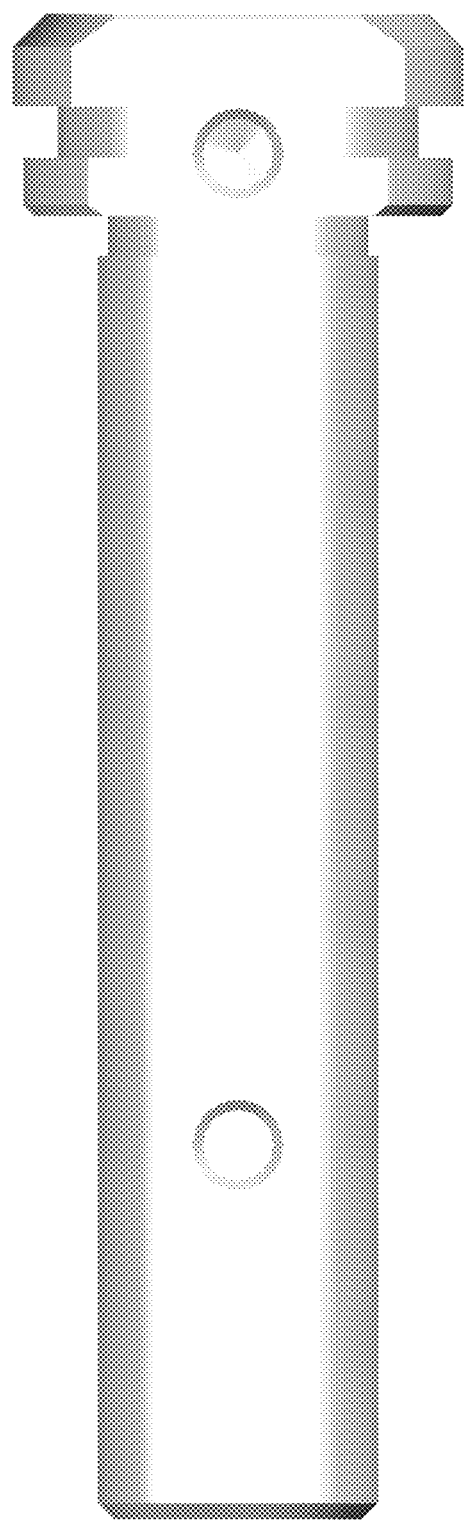
Figure 20:
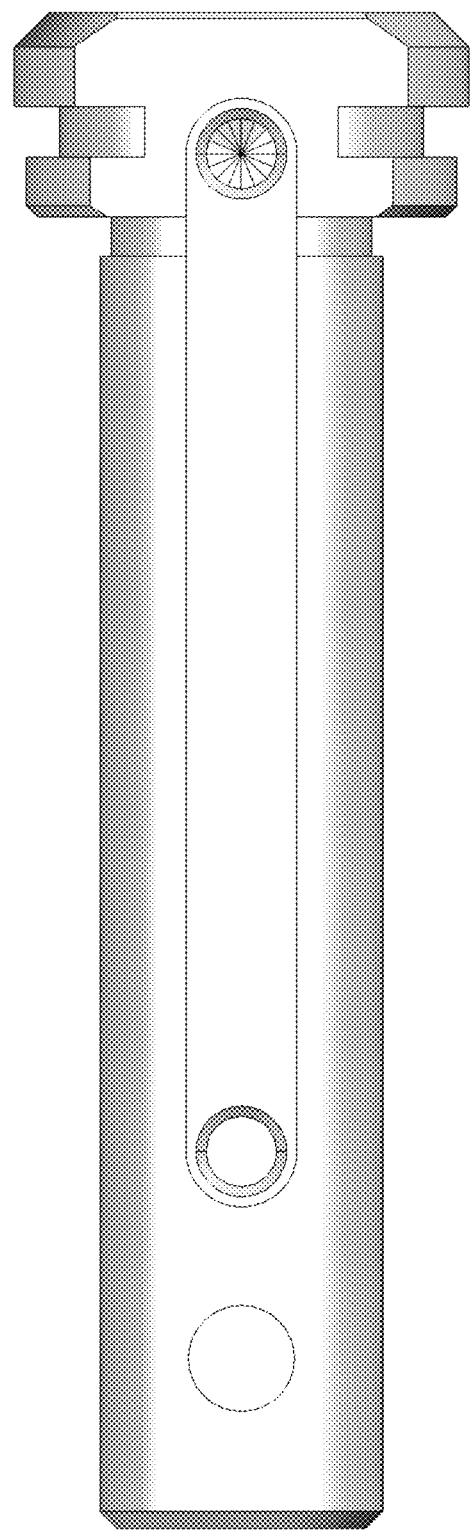
Figure 21:
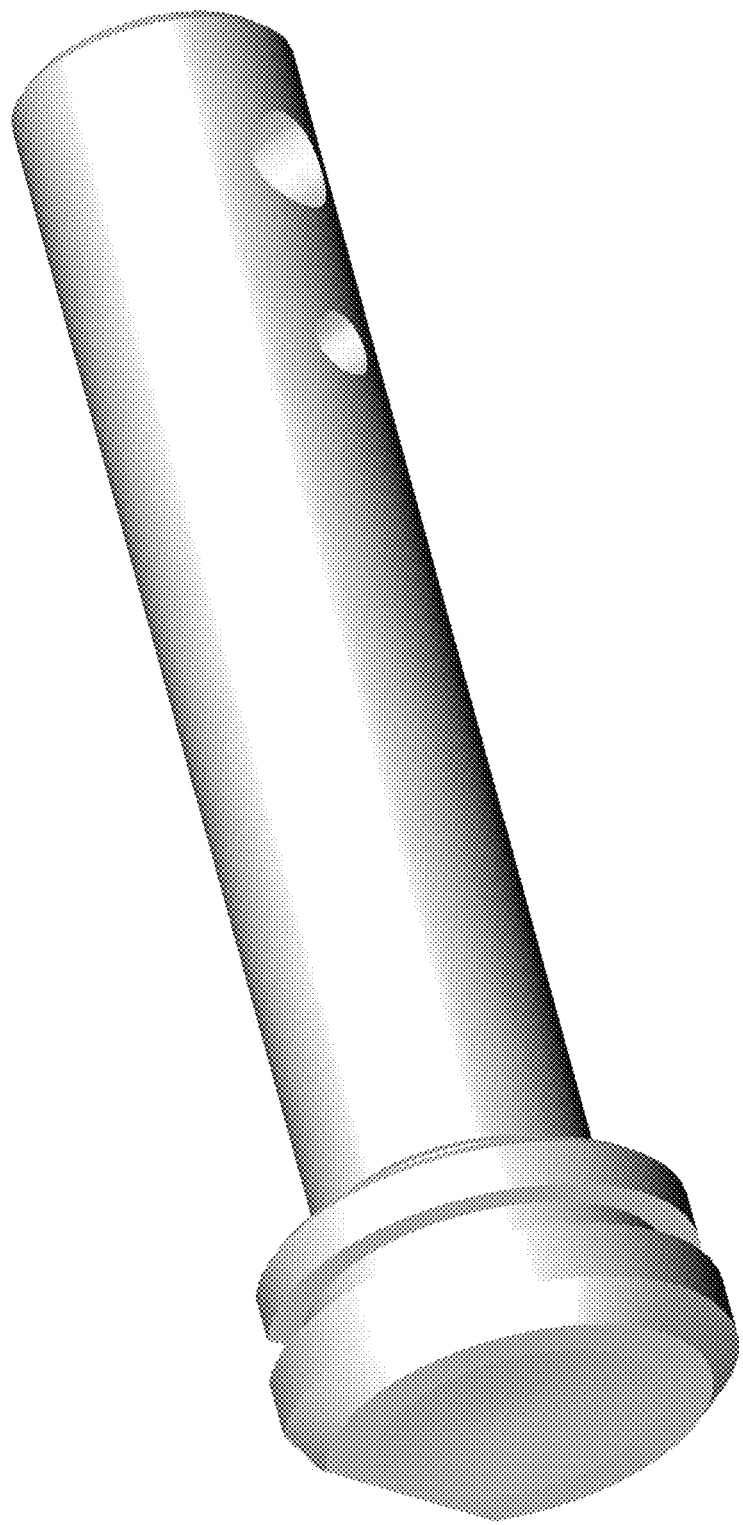
Figure 22:
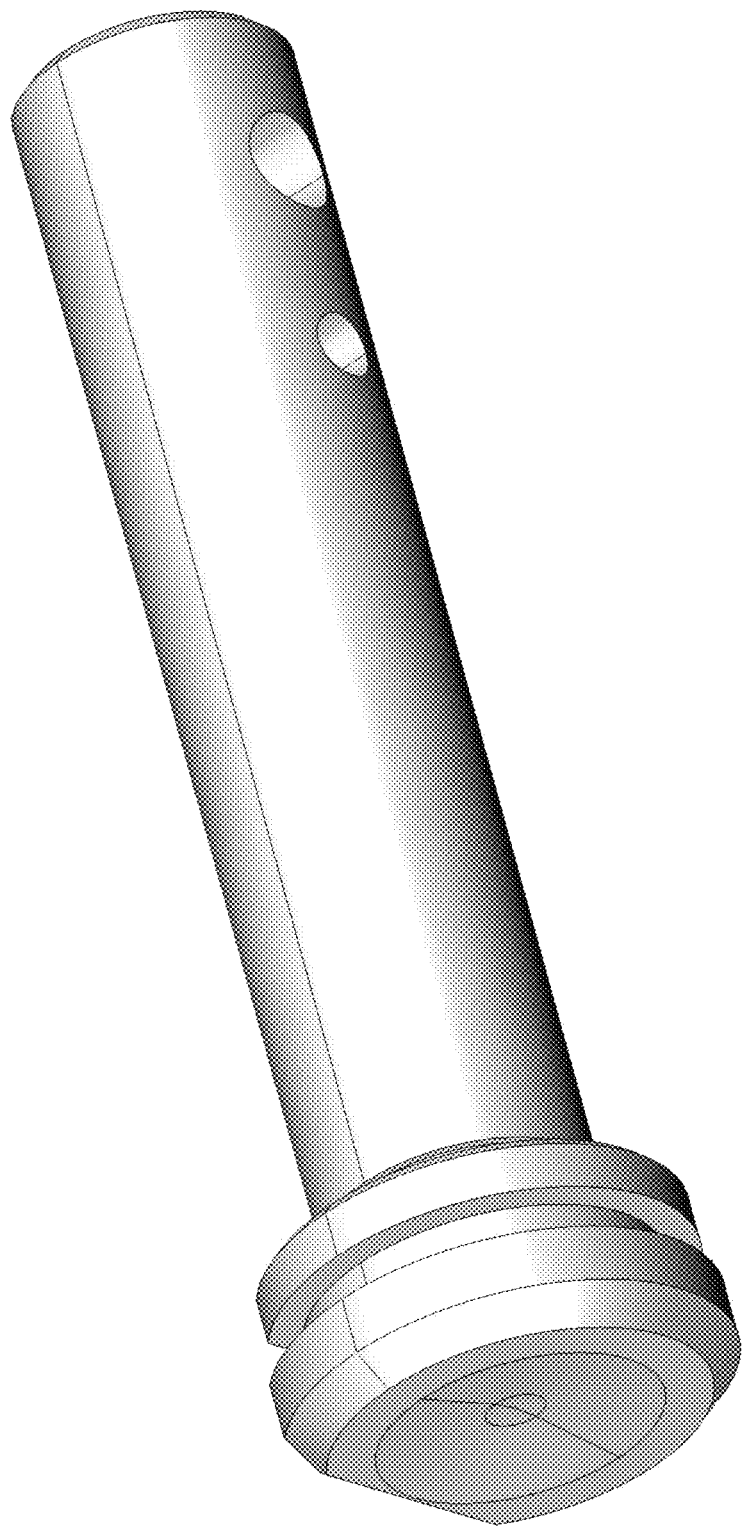
Figure 23:
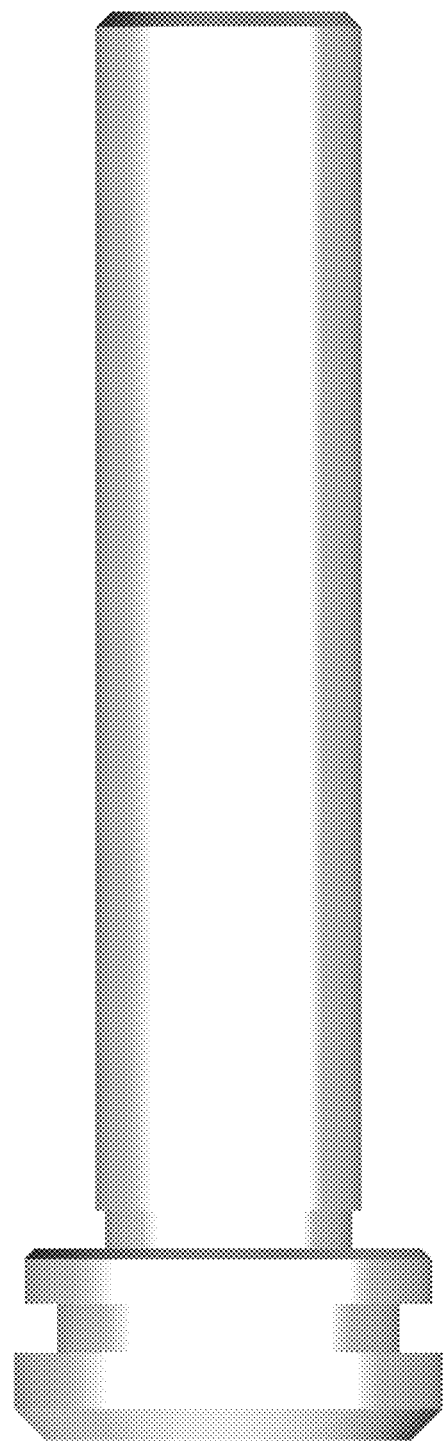
Figure 24:
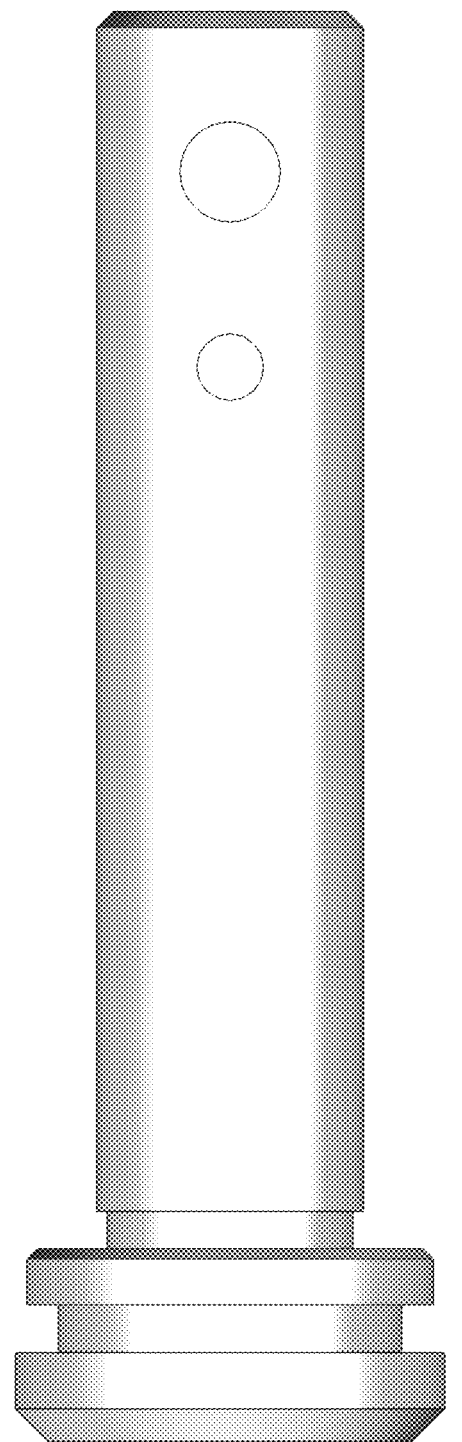
Figure 25:
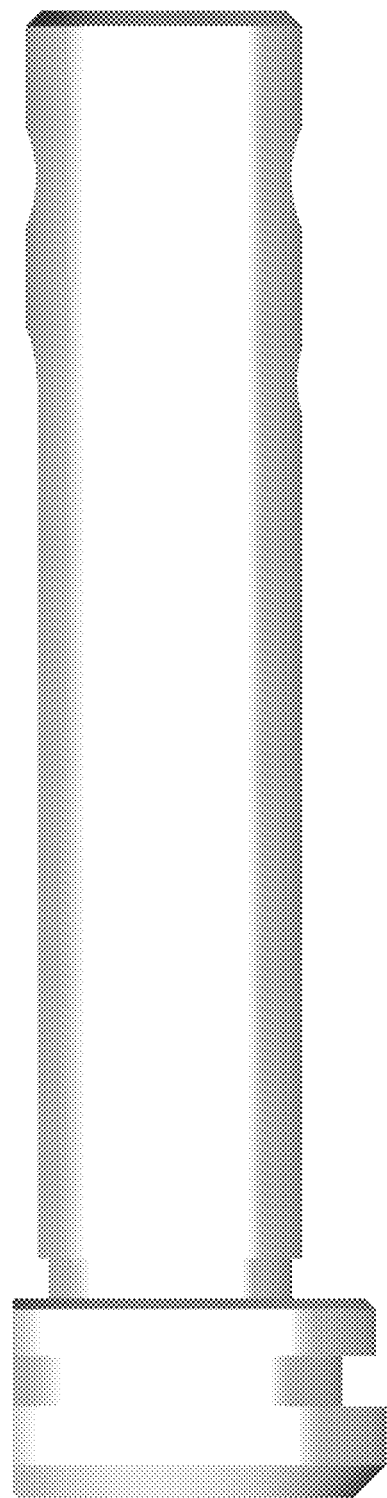
Figure 26:
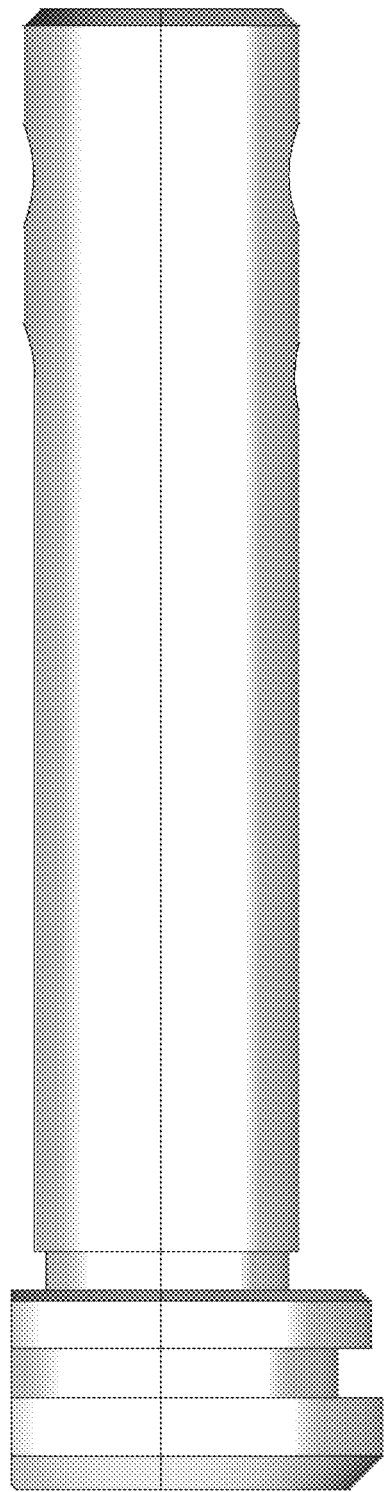
Figure 27:
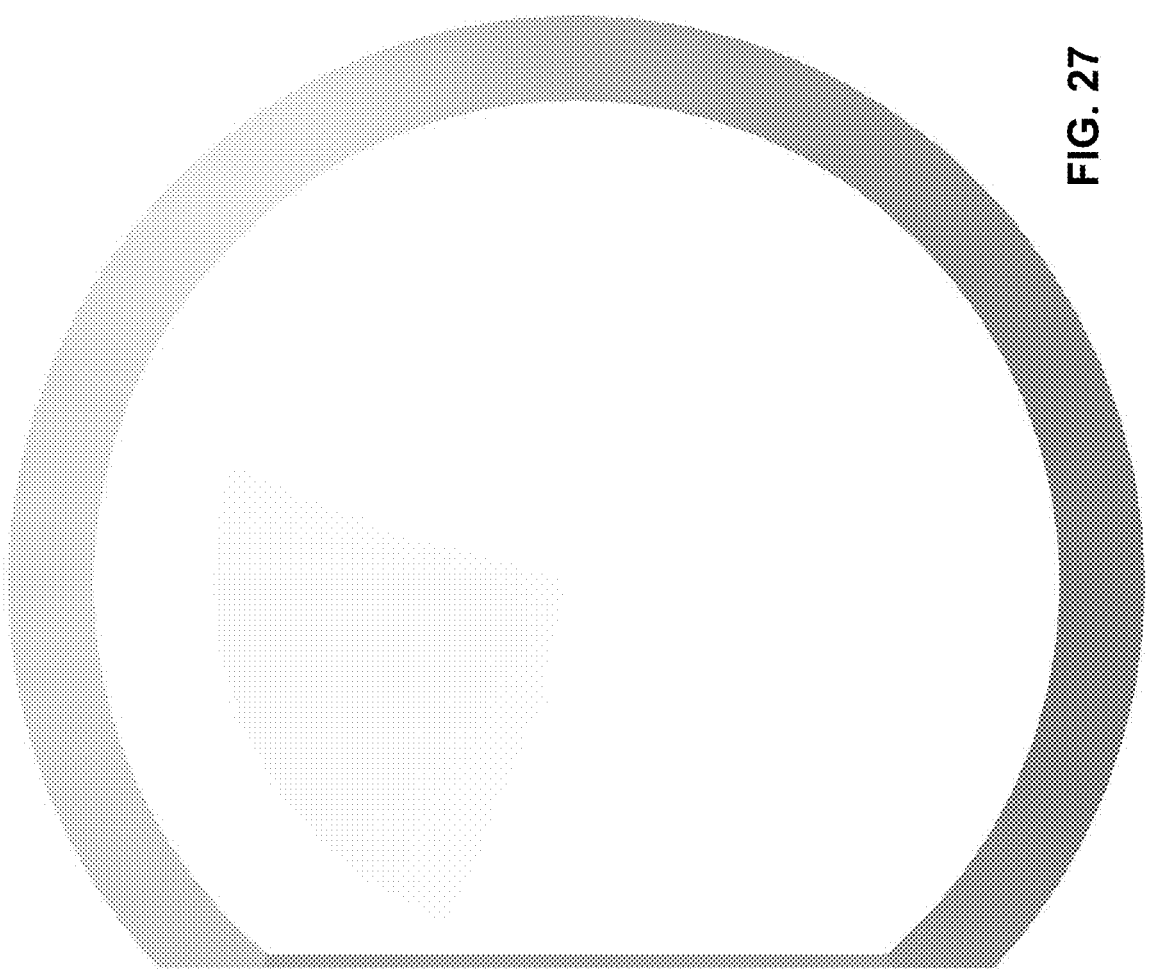
Figure 28:
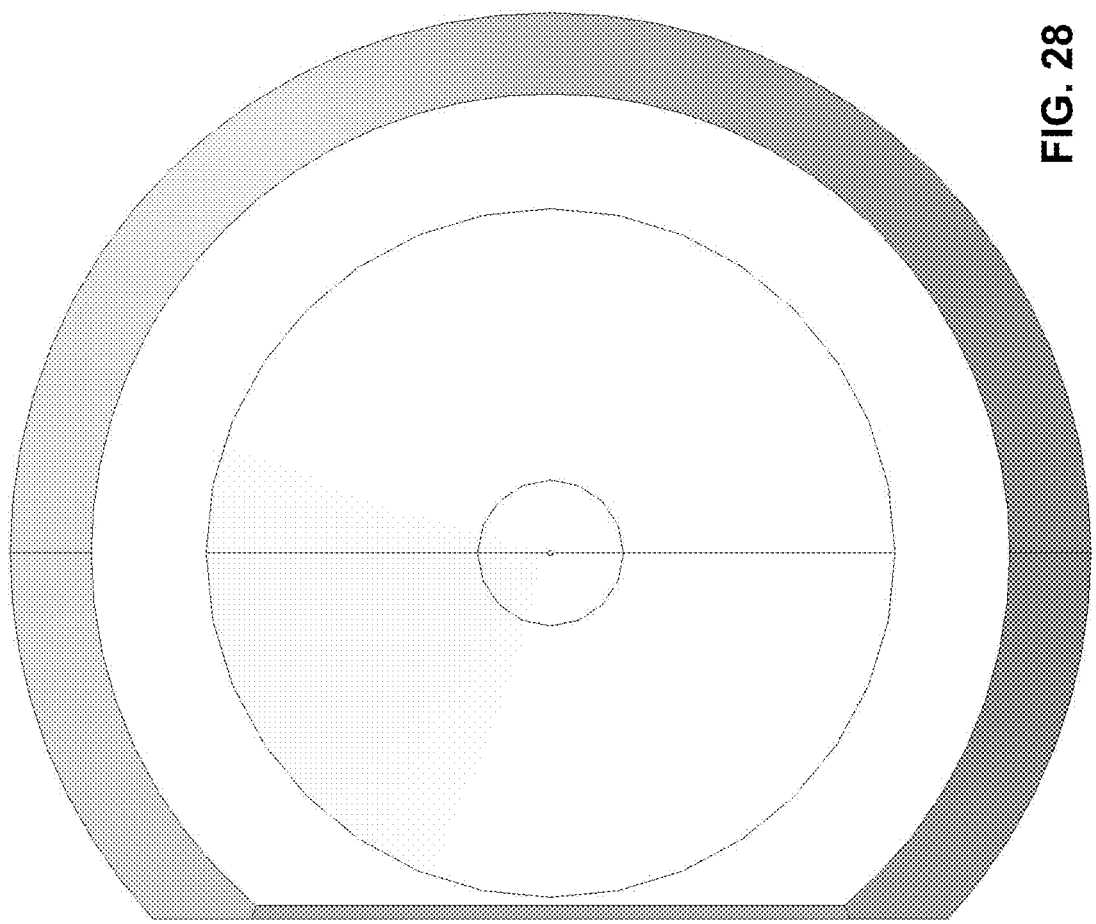
Figure 29:
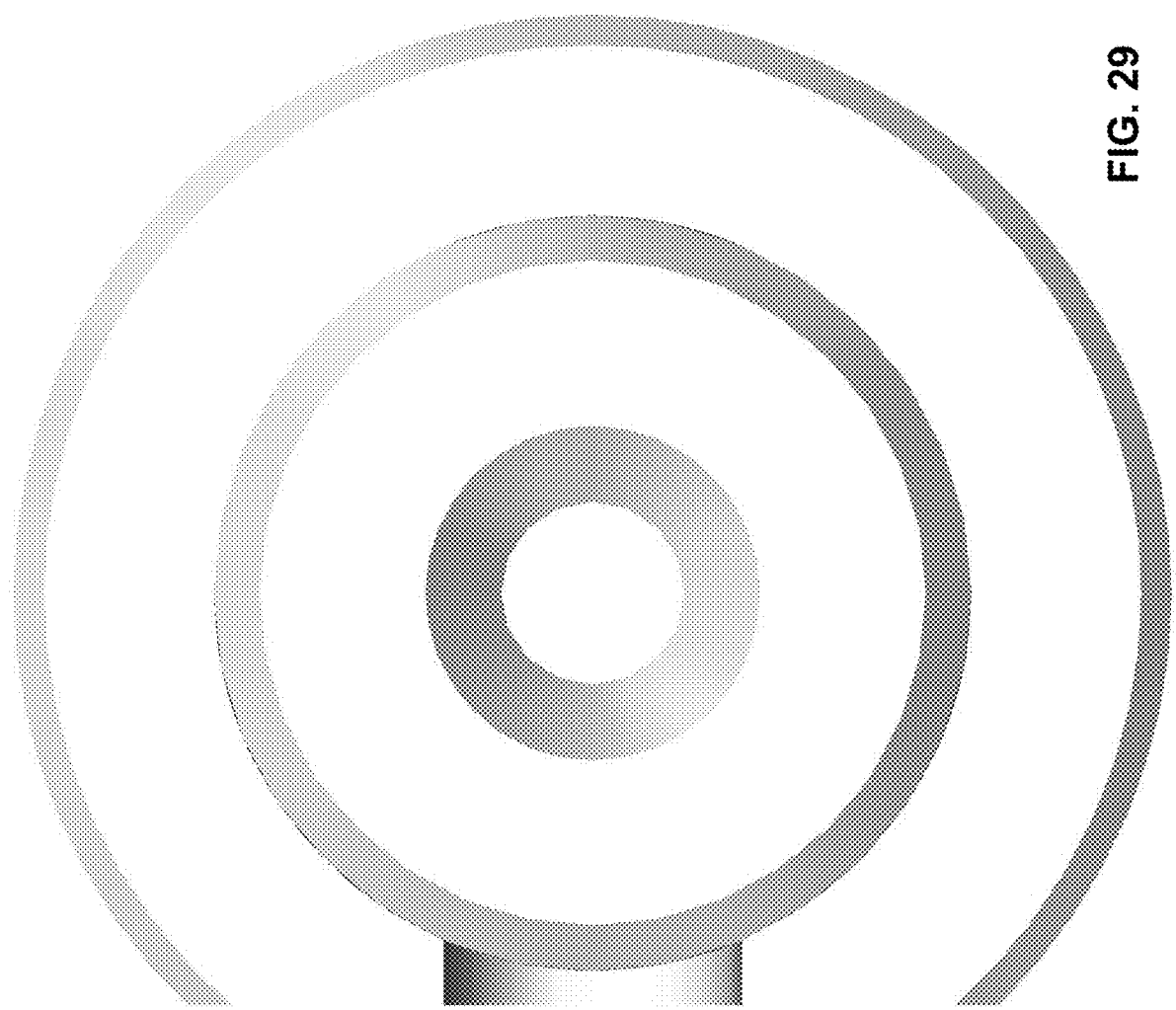
Figure 30:
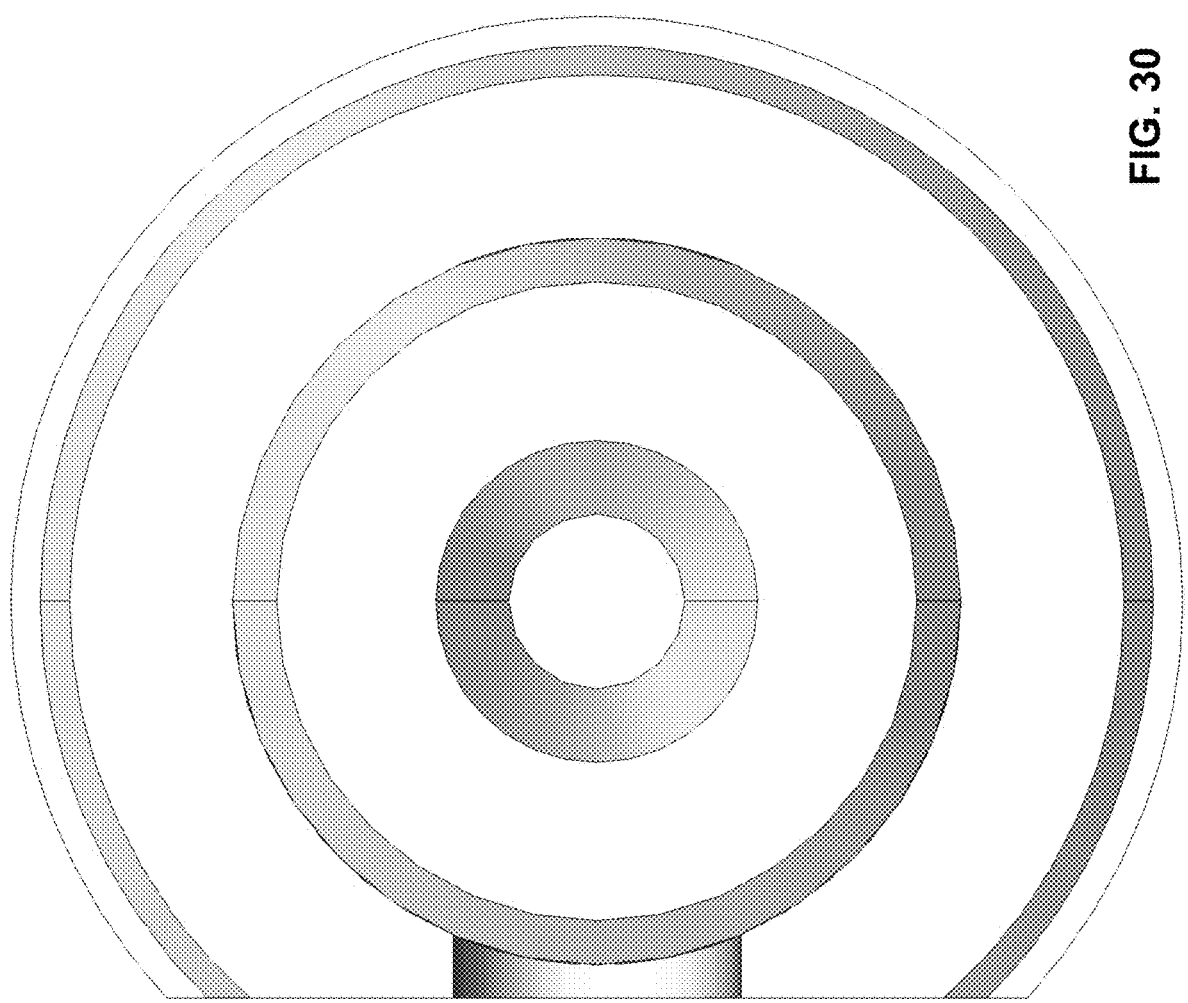
Figure 31:
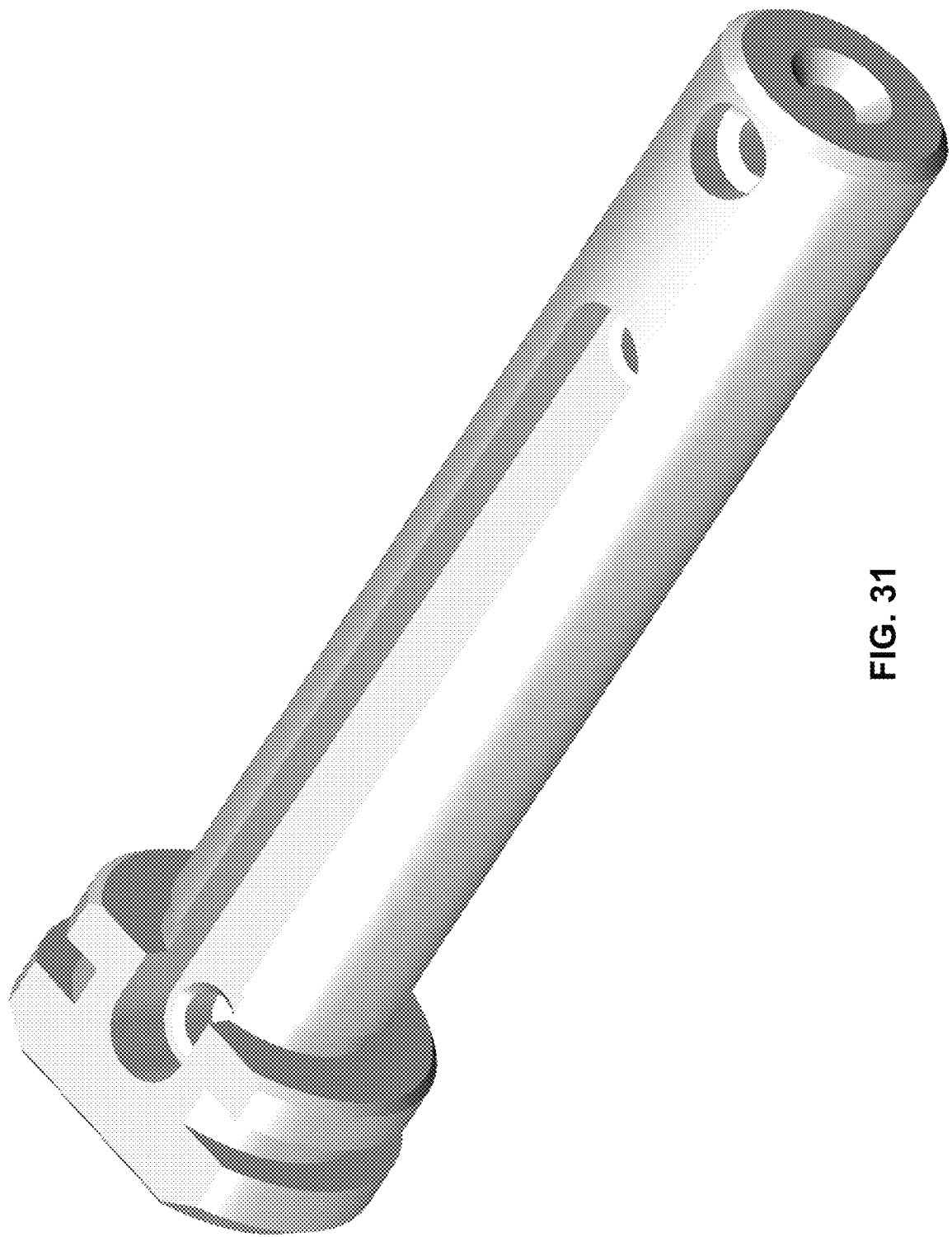
Figure 32:
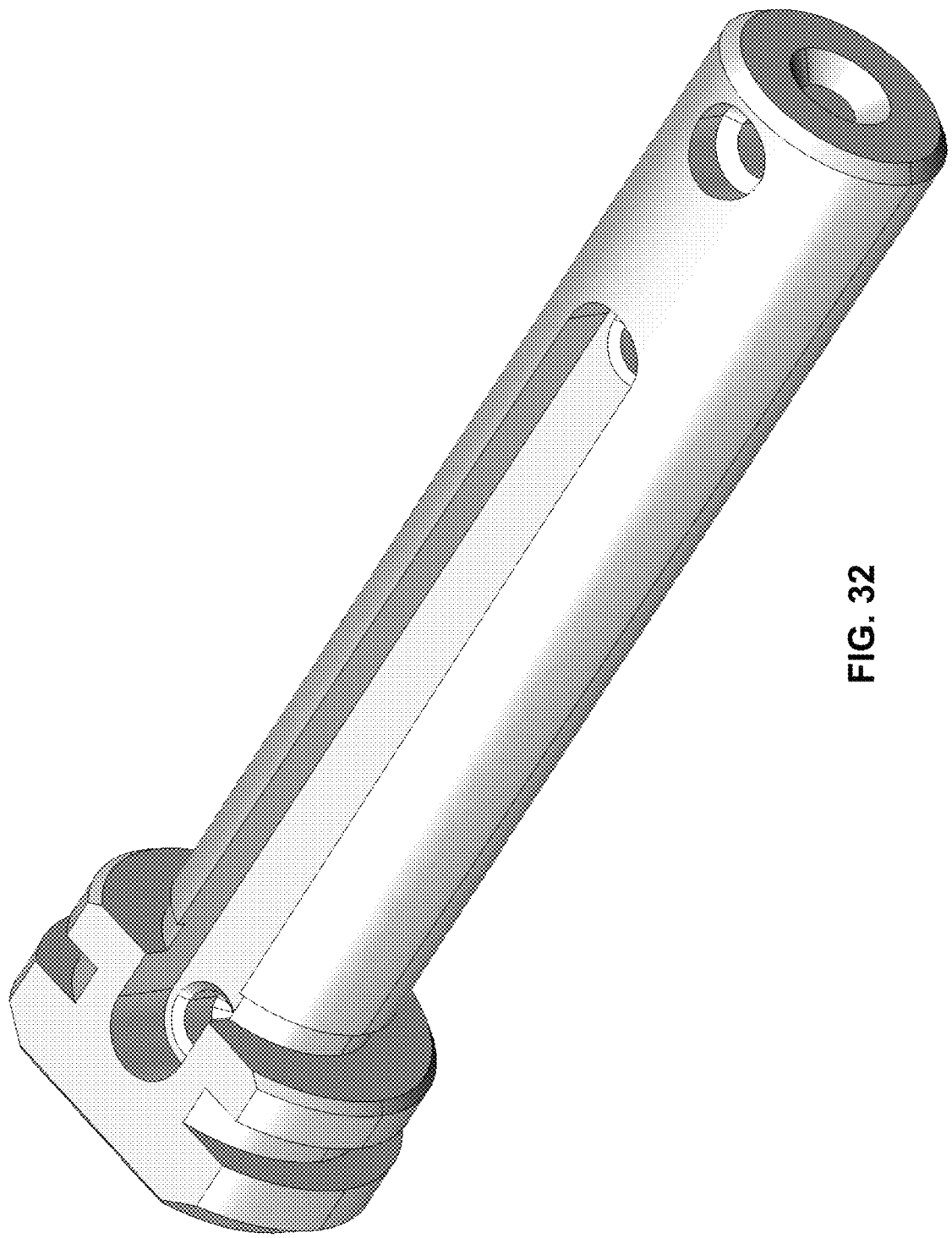
Figure 33:
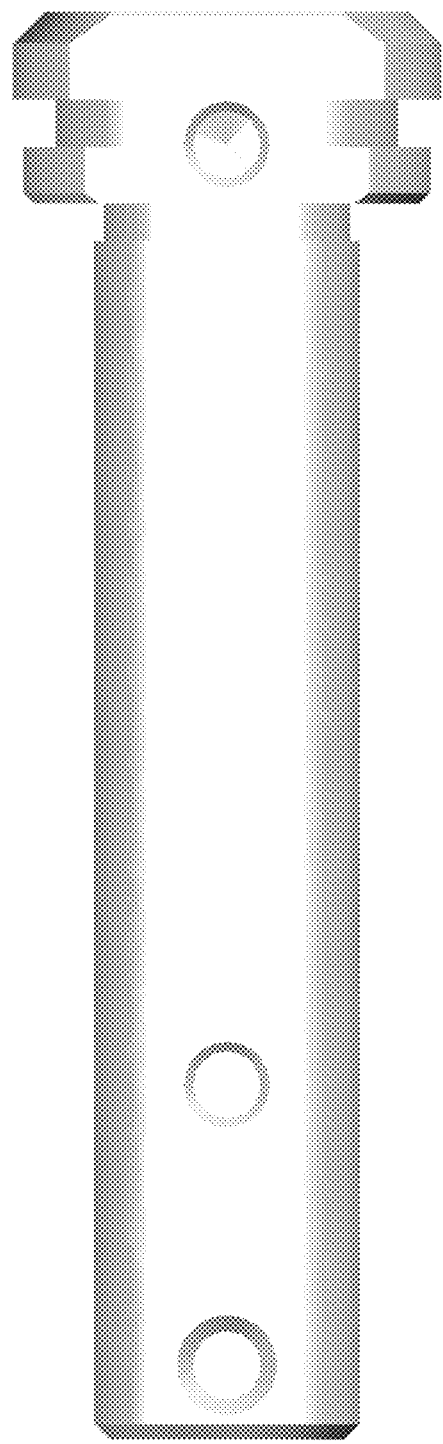
Figure 34:
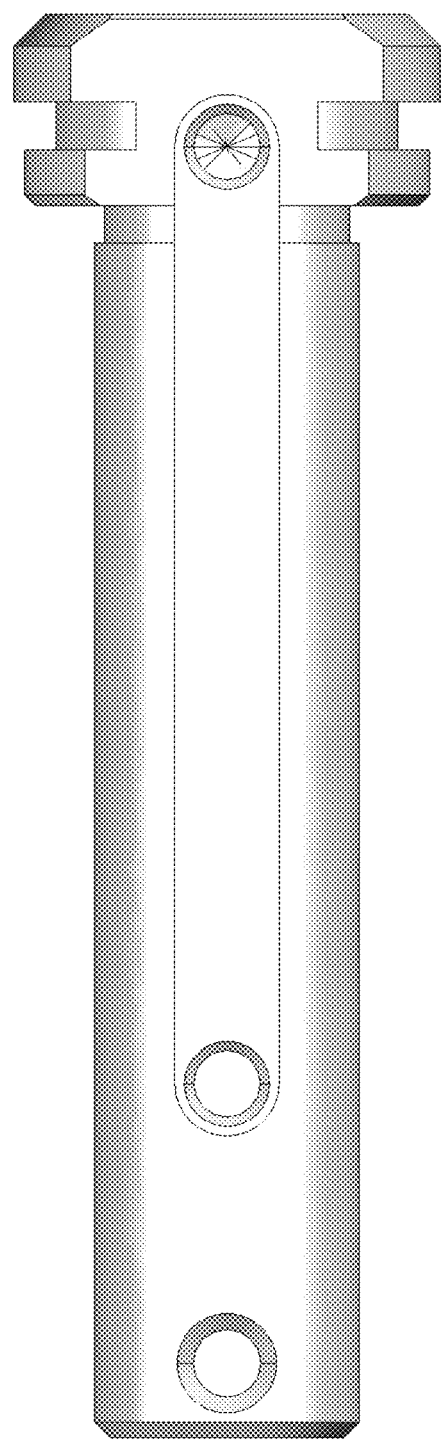
Figure 35:
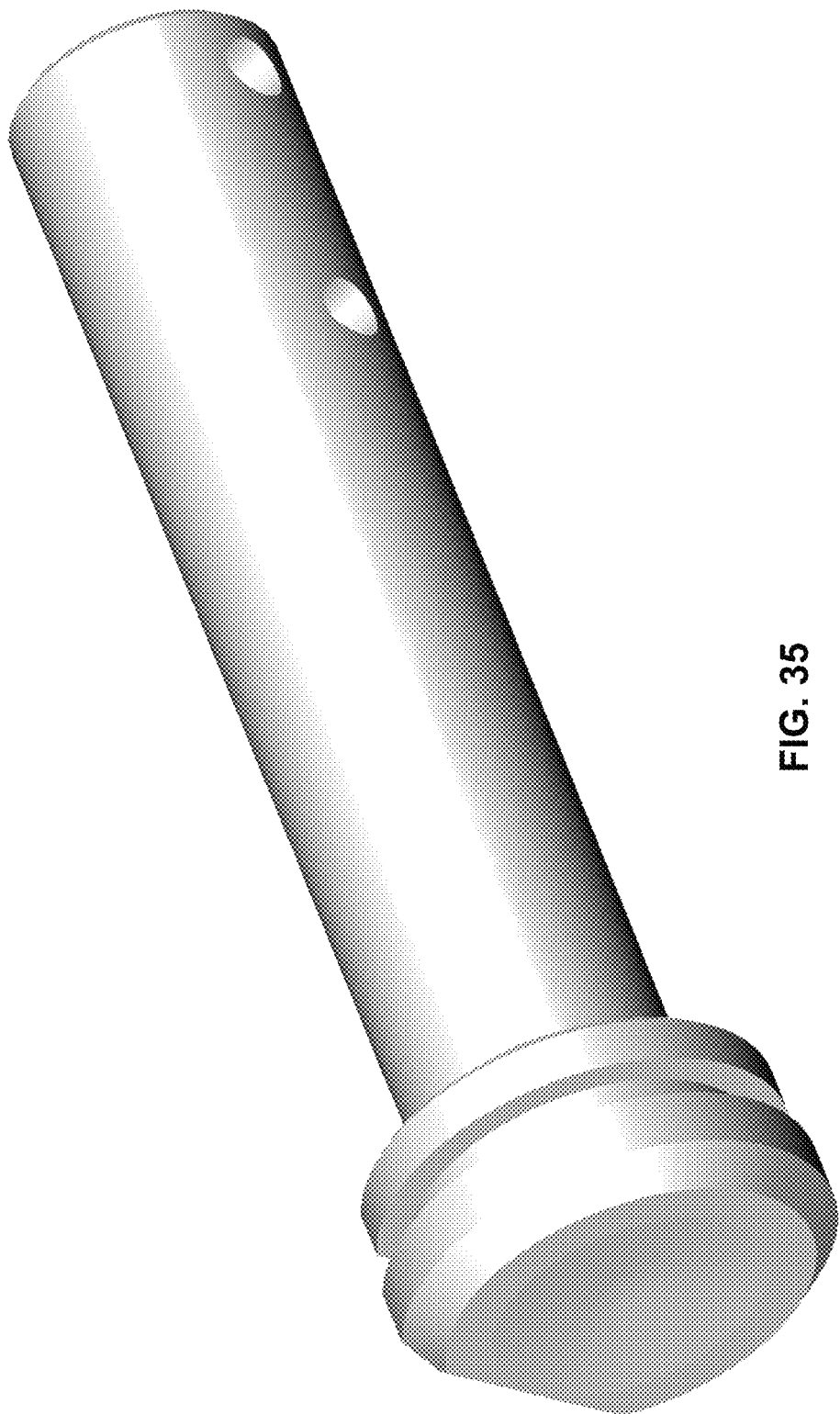
Figure 36:
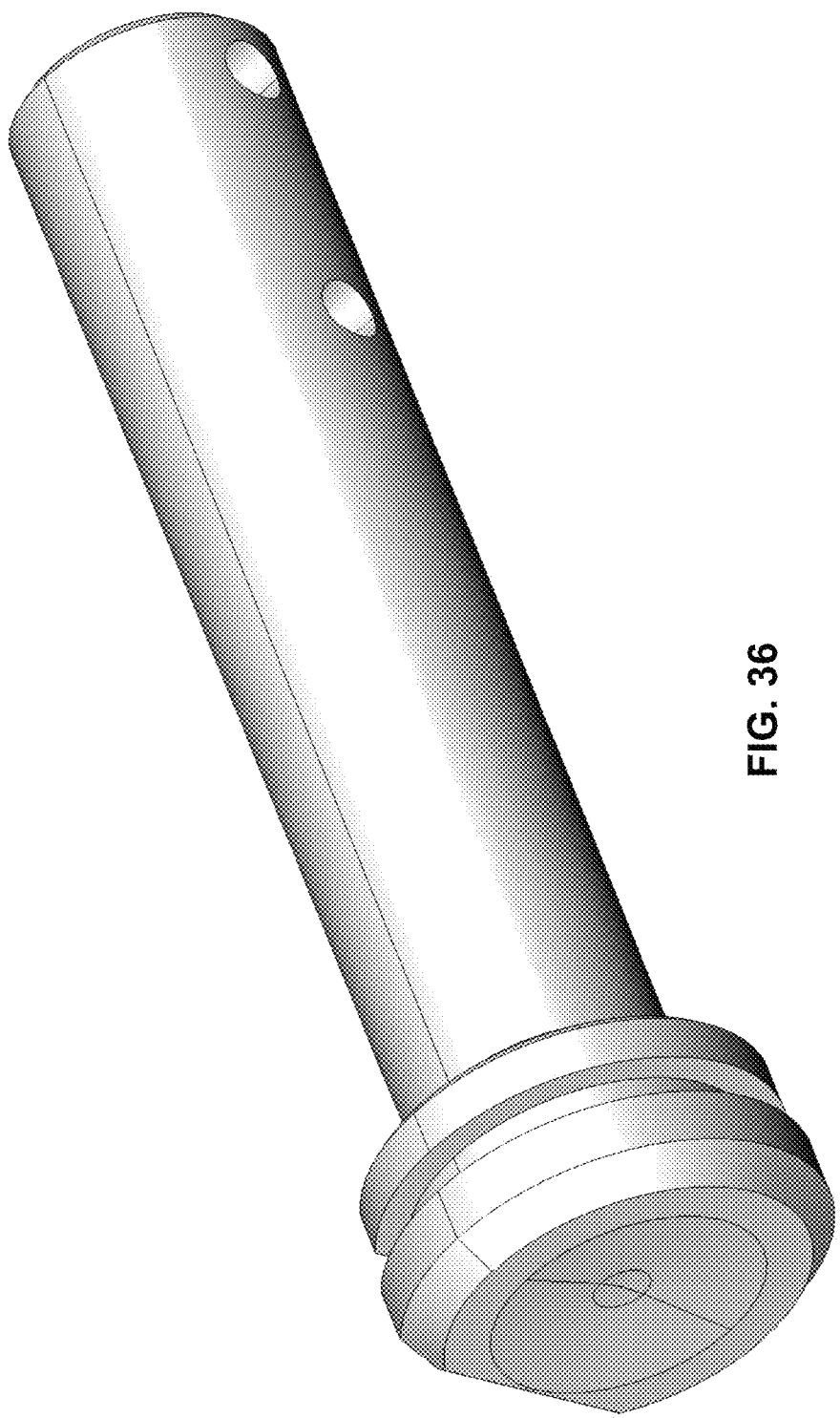
Figure 37:
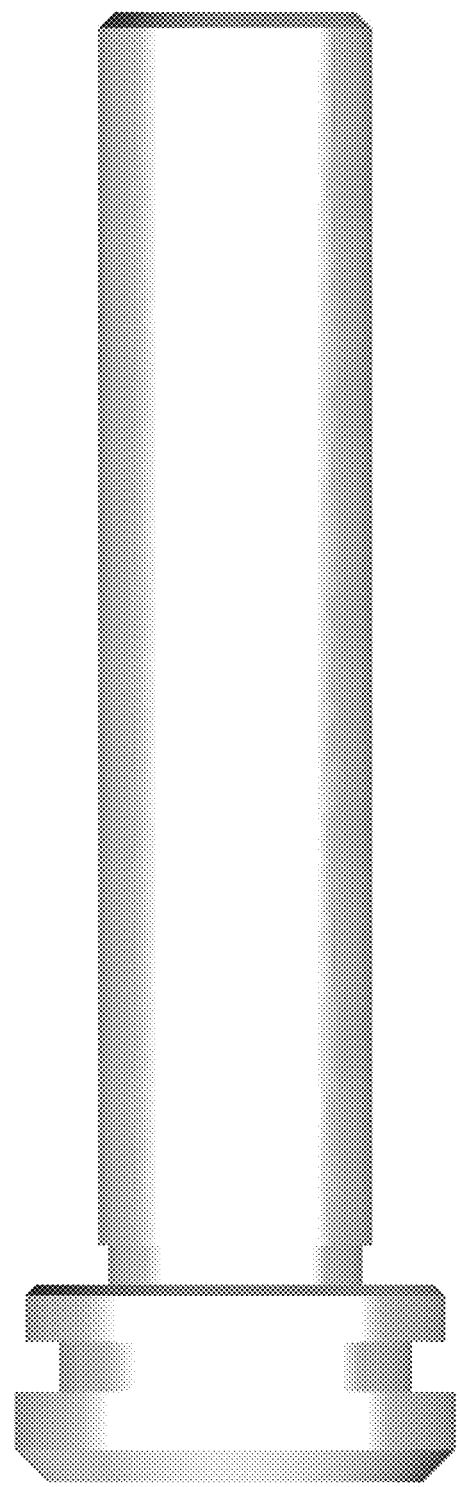
Figure 38:
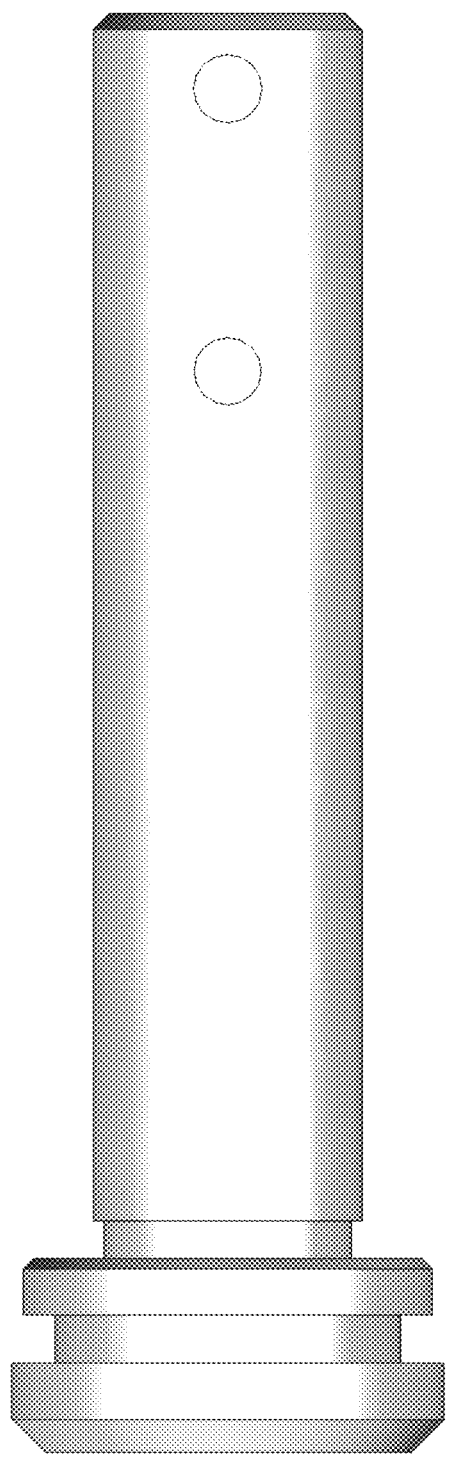
Figure 39:
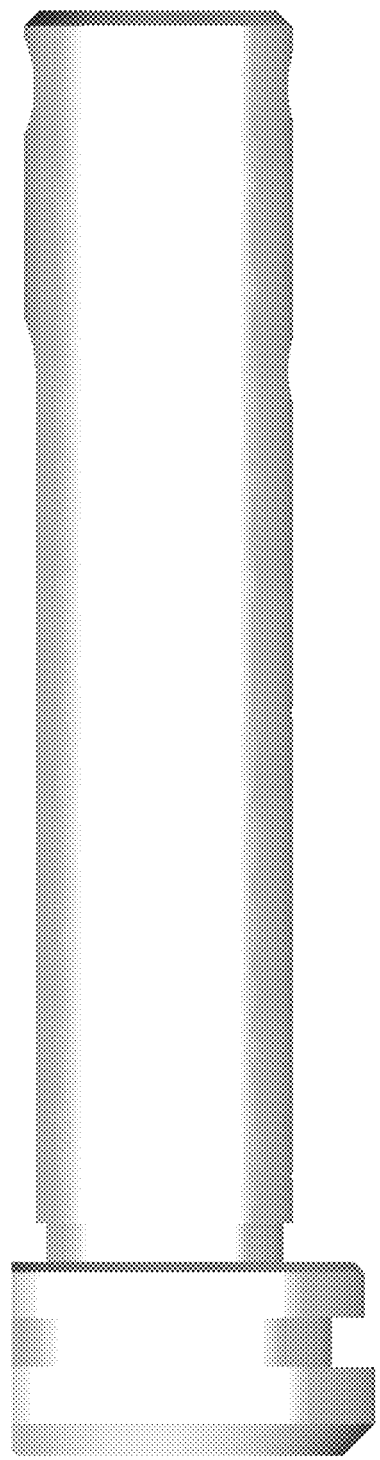
Figure 40:
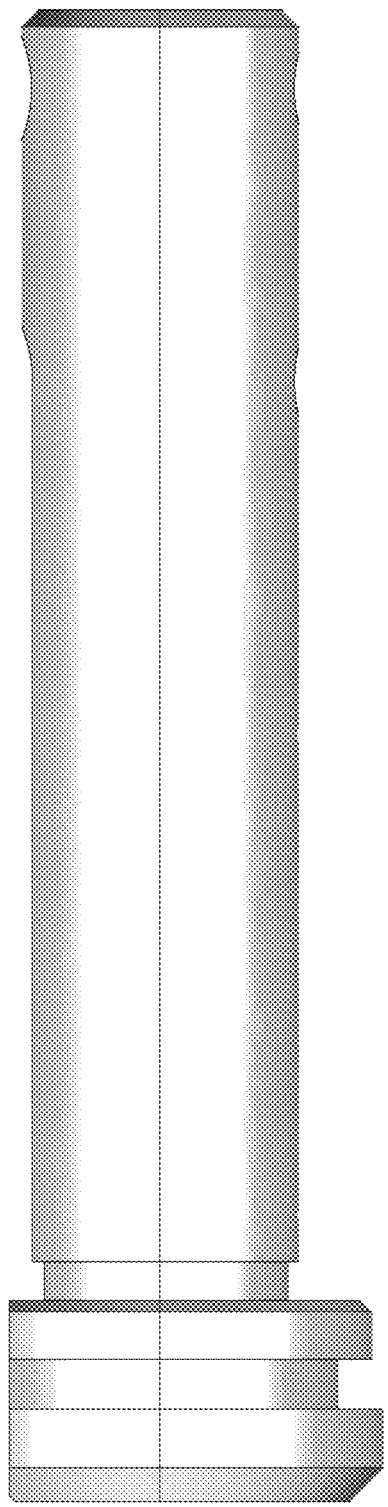

The elevational right and left side views of the pivot pin of FIG. 10 are the same as those of the pivot pin of FIG. 1, as shown in FIGS. 8 and 9.

DETAILED DESCRIPTION OF THE PREFERRED EMBODIMENT

A pivot pin in accordance with the principles of the invention is generally indicated at reference numbers 2 and 4 in the Figures of the attached drawings, wherein numbered elements in the Figures correspond to like numbered elements herein.

As shown in FIG. 1, a first embodiment of a pivot pin 2 and a takedown pin 6 are configured to couple a lower receiver 8 and an upper receiver 10 of a firearm (e.g., an AR-pattern firearm such as an AR-10 or an AR-15) to each other. The pins 2, 6 have respective heads 12, 14 and shafts 16, 18 that extend from the heads 12, 14. The front end portion of the lower receiver 8 has left and right protrusions 32, 34 that define a pair of apertures 36, 38, and the rear end portion of the lower receiver 8 has left and right sidewalls 40, 42 that define a pair of apertures 44, 46. The front and rear end portions of the upper receiver 10 have downward protrusions 48, 50 that define respective apertures 62, 64. The lower receiver 8 is configured to receive the protrusion 48 of the upper receiver 10 between the forward protrusions 32, 34 such that the front aperture 62 in the upper receiver 10 aligns with the front apertures 36, 38 in the lower receiver 8. The lower receiver 8 is also configured to receive the protrusion 50 of the upper receiver 10 between the sidewalls 40, 42 such that the rear aperture 64 in the upper receiver 10 aligns with the rear apertures 44, 46 in the lower receiver 8. Accordingly, the pivot pin 2 is configured to insert into the front apertures 36, 38, 62 to pivotably couple the upper receiver 10 and the lower receiver 8 to each other, and the takedown pin 6 is configured to insert into the rear apertures 44, 46, 64 to fixedly couple the upper receiver 10 and the lower receiver 8 to each other.

When the pins 2, 6 are installed, detents 66, 68 bias by springs 70, 72 retain the pins 2, 6 in the lower receiver 8. The spring 72 that biases the retention detent 68 against the takedown pin 6 presses against a faceplate (not shown) installed at the rear of the lower receiver 8 after the takedown pin 6 is inserted into the aperture 46, the detent 68 is inserted into a rear detent aperture 74 defined by a rear end portion of the lower receiver 8, the spring 72 is installed in the rear detent aperture 74 rearward of the detent 68, and the faceplate is coupled to the lower receiver 8. In contrast, the spring 70 that biases the retention detent 66 against the pivot pin 2 presses against an interior surface of a detent recess 76 defined by the front end portion of the lower receiver 8 after the spring 70 is inserted into the detent recess 76 and the detent 66 is placed between the pivot pin 2 and the spring 70.

Unlike conventional pivot pins, however, the shaft 16 of the pivot pin 2 defines an installation aperture 78 that is spaced apart from a detent-retention channel 80 and that extends entirely through the shaft 16 of the pin 2 and that is configured to receive a tool (schematically illustrated as tools 91, 93) such as a hex wrench having an outer diameter no greater than the inner diameter 79 of the aperture 78 (see FIGS. 3 and 4) and a portion with a length at least as long as that of the aperture 78, thereby urging the retention detent 66 into the detent recess 76. Accordingly, the pivot pin 2 facilitates installation of the pin 2 without using the pivot pin 2 to initially compress the spring 70 and detent 66 into the detent recess 76. Also accordingly, unlike the pivot pin of Huang, the pivot pin 2 enables translating the pin 2 in the aperture 38 of the lower receiver 8 while the tool urges the detent 66 into the detent recess 76 in the lower receiver 8 without applying significant force in the direction of the longitudinal axis of the pin 2 to cause the detent 66 to jump out of a stabilizing recess and translate along the longitudinal axis of the detent 66. The pivot pin 2 therefore simplifies the installation process.

In some embodiments, the installation aperture 78 is configured to receive at least one of the detent 66 or the spring 70 and thus has an inner diameter 79 (see FIGS. 3 and 4) that is no smaller than or is at least as great as the outer diameter of at least the detent 66. In some embodiments in which the installation aperture 78 is configured to receive the spring 70 and in which the spring 70 has a greater outer diameter than the detent 66, the inner diameter 79 of the installation aperture 78 is no smaller than or is at least as great as the outer diameter of the spring 70. Accordingly, in some embodiments, the pivot pin 2 facilitates inserting at least one of the spring 70 or the detent 66 into the detent recess 76 while the pivot pin 2 covers the detent recess 76, thereby eliminating the need to use the pivot pin 2 to overcome the bias of the spring 70.

In some embodiments, a user covers the detent recess 76 with the pivot pin 2 by holding the pivot pin 2 against the front of the lower receiver 8 or partially in the aperture 38. In some embodiments, while the pivot pin 2 covers the detent recess 76, the user subsequently inserts at least one of the spring 70 or the detent 66 into the installation aperture 78. In some embodiments, the user installs the spring 70 in the detent recess 76 before covering the detent recess 76 with the pivot pin 2. In some embodiments, after the user inserts at least one of the spring 70 or the detent 66 into the installation aperture 78, the user compresses the spring 70 by pressing the tool through the installation aperture 78 and against the front end portion of the detent 66 to urge the detent 66 entirely through the installation aperture 78 and into the detent recess 76. The user then slides the pivot pin 2 in the aperture 38 toward the left side of the lower receiver 8 (typically by pressing the head 12) until the detent 66 no longer aligns with the installation aperture 78, at which point the user removes the tool from the installation aperture 78.

Figure 2:
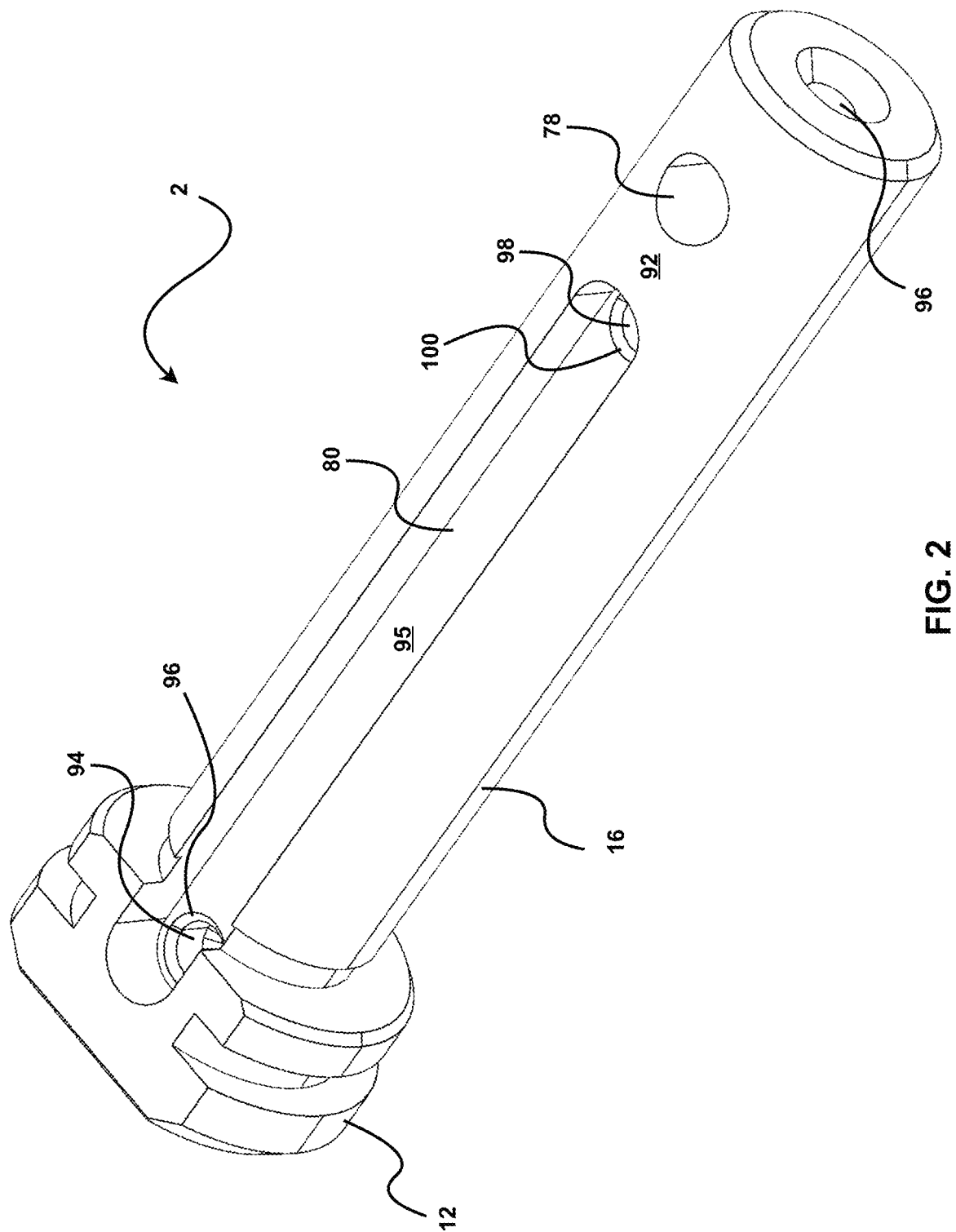
FIG. 2 is an isometric perspective rear view of the pivot pin of FIG. 1.
Figure 3:
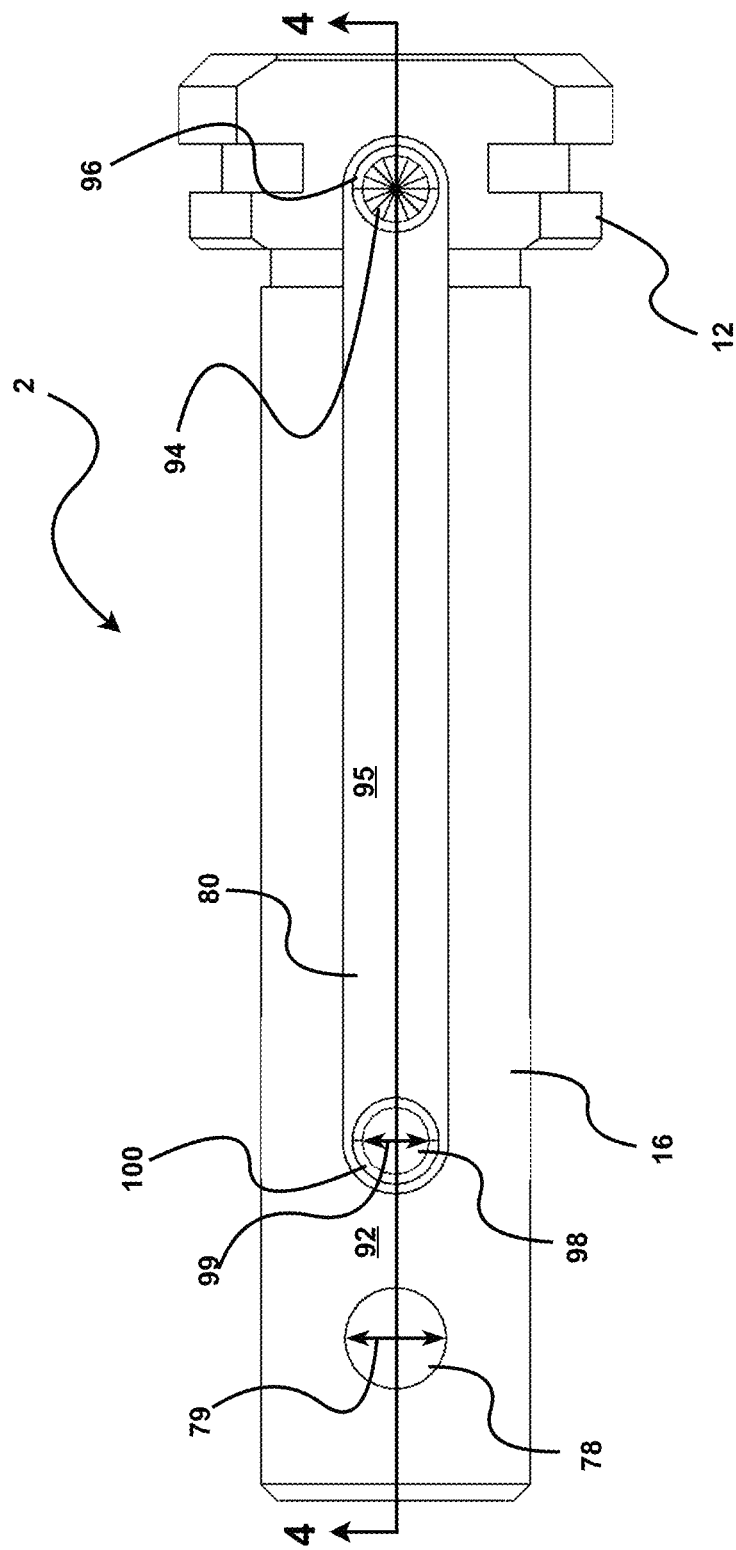
FIG. 3 is a rear elevational view of the pivot pin of FIG. 1.
Figure 4:
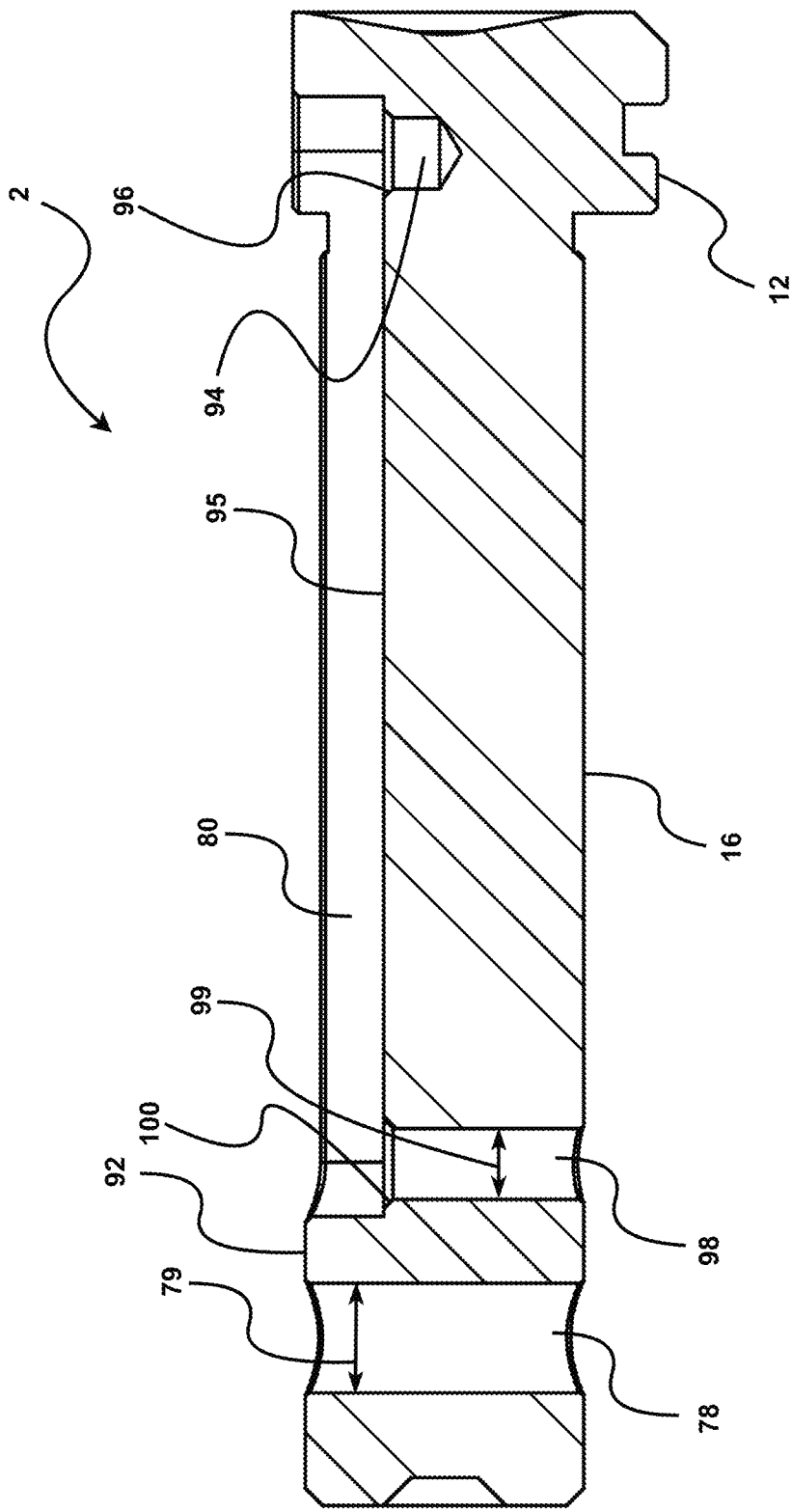
FIG. 4 is a cross-sectional view of the pivot pin of FIG. 1, taken along line 4-4 in FIG. 3.
Figure 5:
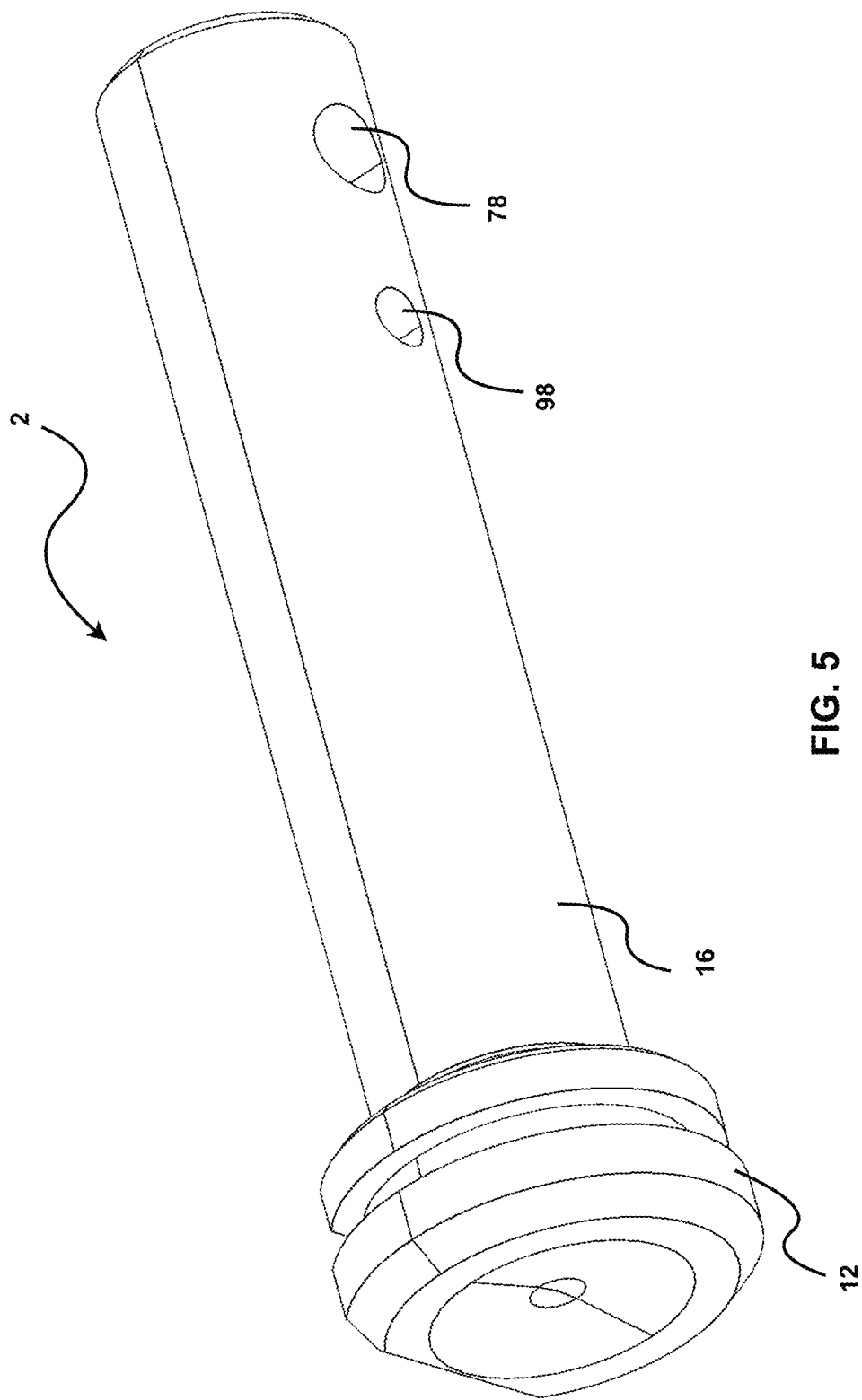
FIG. 5 is an isometric perspective front view of the pivot pin of FIG. 1.
Figure 6:
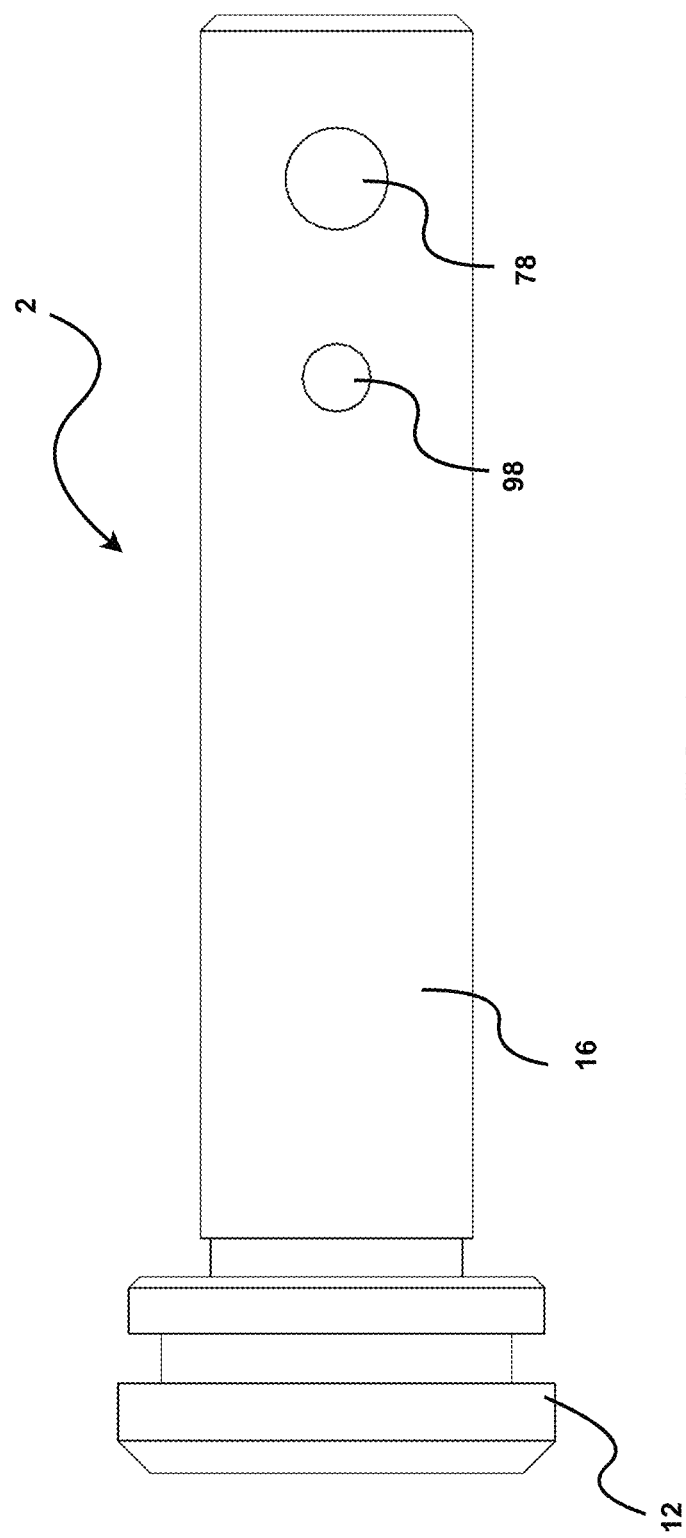
FIG. 6 is a front elevational view of the pivot pin of FIG. 1.
Figure 7:
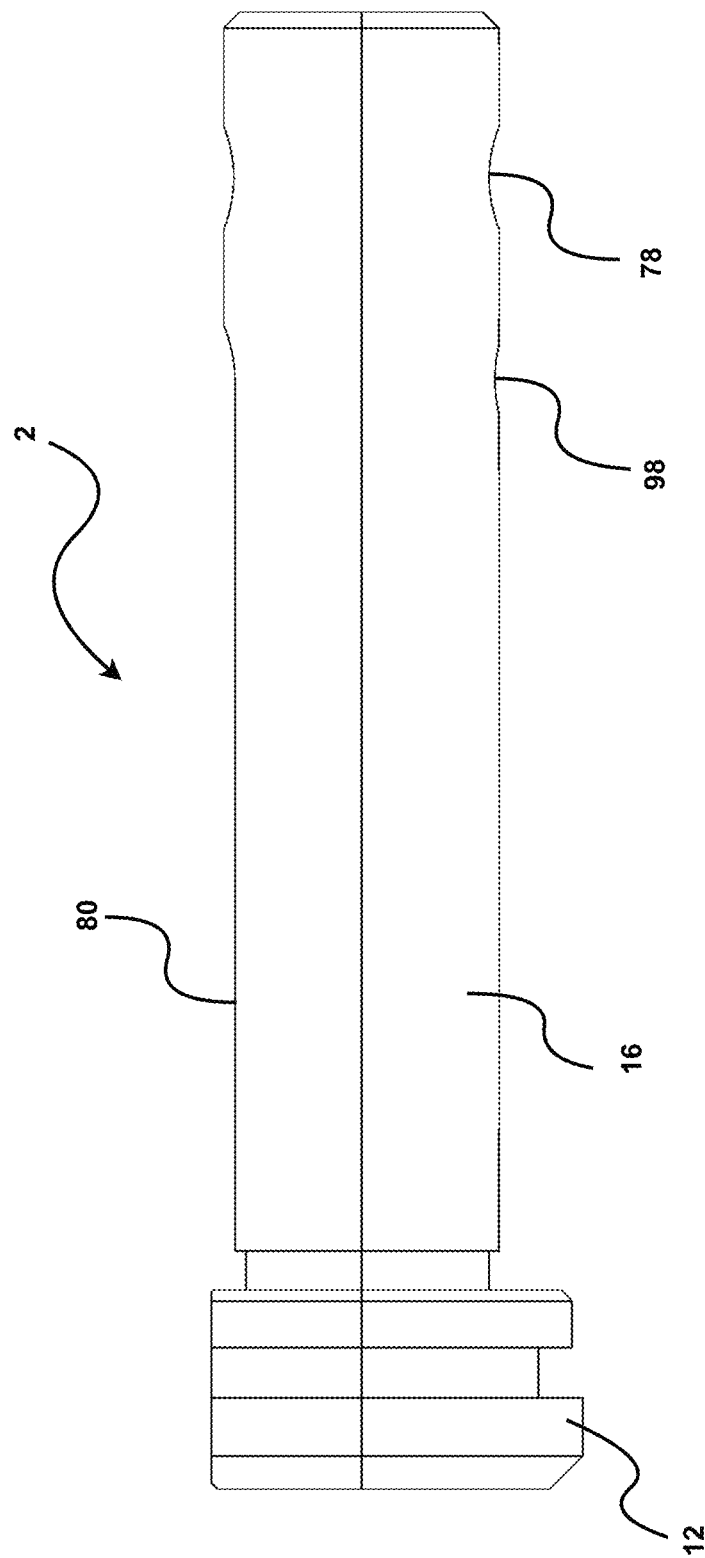
FIG. 7 is an overhead view of the pivot pin of FIG. 1, the bottom view being a mirror image thereof.

As shown in FIGS. 2-4, the pivot pin 2 defines a detent-retention channel 80 that extends along the shaft 16. In some embodiments, the pivot pin 2 defines an intermediate region 92 disposed between the installation aperture 78 and the channel 80, and the detent 66 slides along the intermediate region 92 after the detent 66 no longer aligns with the installation aperture 78 during the installation process. In some embodiments, the user continues to slide the pivot pin in the aperture 38 of the lower receiver 8 toward the left side of the lower receiver 8 (again, typically by pressing the head 12) until the detent channel 80 receives the detent 66, thereby indicating that the pivot pin 2 has been successfully installed in the lower receiver 8. In some embodiments, the pivot pin 2 defines an installation channel (not shown) that extends from the installation aperture 78 to the channel 80, and the installation channel is shallower than the channel 80 to prevent the detent from escaping the detent-retention channel 80 into the installation channel until the tool 93 is inserted through the removal aperture 98 and urges the detent out of the detent-retention channel 80.

In some embodiments, as shown in FIGS. 2-4, the pivot pin 2 defines a detent-retention recess 94 in the right end portion of the detent channel 80. The detent-retention recess 94 is configured to receive and removably retain the detent 66 when the pivot pin 2 is fully inserted into the front apertures 36, 38, 62 of the lower and upper receivers 8, 10, thereby retaining the pivot pin 2 in the locked configuration. The detent-retention recess 94 in some embodiments has a countersunk or ramp shape that directly couples to a main floor 95 of the channel 80 to facilitate easier transitioning of the pivot pin 2 from the locked configuration to the unlocked configuration compared to the recess 94 having a counterbore shape. In the locked configuration, the pivot pin 2 couples the upper receiver 10 and the lower receiver 8 to each other in a pivotable manner until the takedown pin 6 is installed and transitioned to the locked configuration by sliding the takedown pin 6 with the detent 68 in a channel into a detent-retention recess in the takedown pin 6 (similar to that shown in FIGS. 2-4 in the pivot pin 2), at which point the upper and lower receivers 8, 10 are fixedly coupled to each other. In some embodiments, the left end portion of the pivot pin 2 defines a recess 96 that is configured to receive a tool (e.g., a bullet tip) to facilitate applying a force to the pivot pin 2 in a direction along its longitudinal axis toward the right side of the pivot pin 2 and thereby transition the pivot pin 2 from the locked configuration to the unlocked configuration in which the upper and lower receivers 8, 10 are separable from each other. In some embodiments, the detent-capture recess 94 has a rim 96 with a countersunk or ramp shape, and the rim 96 directly couples to the main floor 95 of the channel 80, which facilitates reducing the force required to release the detent 66 from the detent-retention recess 94 and thereby transition the pivot pin 2 from the locked configuration to the unlocked configuration.

In some embodiments, as shown in FIGS. 1-6, the pivot pin 2 defines a removal aperture 98 in the left end portion of the channel 80 to facilitate removing the detent 66 from the channel 80 with a tool, such as the tool 93 (e.g., a hex wrench), having an outer diameter that is no greater than the inner diameter 99 of the aperture 98 and a length at least as long as that of the aperture 98. In some embodiments, the removal aperture 98 has a rim 100 with a countersunk or counterbored shape that is configured to retain the detent 66 while the pivot pin 2 is in the unlocked configuration to simplify separation of the upper and lower receivers 8, 10 from each other. The rim 100 in some embodiments has a countersunk or ramp shape and directly couples to the main floor 95 of the channel 80 that extends between the retention recess 94 and the removal aperture 98, which facilitates easier transitioning of the pivot pin 2 from the unlocked configuration to the locked configuration without use of the tool 93. In some embodiments, unlike the installation aperture 78, the removal aperture 98 has an inner diameter 99 that is smaller than the outer diameter of the detent 66, thereby preventing the detent 66 and spring 70 from escaping the detent recess 76 in the lower receiver when the pivot pin 2 is transitioned to the unlocked configuration. Instead, in some embodiments, when the pivot pin 2 is in the unlocked configuration, the tool is inserted into the removal aperture 98 to urge the detent 66 out of the channel 80, and the user moves the pivot pin 2 rightward relative to the lower receiver 8 until the detent 66 no longer aligns with the channel 80 and instead presses against the intermediate region 92. To uninstall the pivot pin 2 in some embodiments, the user can continue to move the pivot pin 2 rightward until the detent 66 aligns with the installation aperture 78 and escapes the detent recess 76 into or through the installation aperture 78 such that the pivot pin 2 is free to be removed from the front aperture 38 in the lower receiver. Alternatively in some embodiments, the user rotates the pivot pin 2 and continues moving the pivot pin 2 rightward such that the detent 66 bypasses the installation aperture 78 and the pivot pin 2 is free to be removed from the front aperture 38. Accordingly, the pivot pin 2 facilitates removal of the pivot pin 2 from the lower receiver 2 without special or modified tools, such as a hex wrench with an angle cut into one of the tips to facilitate lifting the detent 66 after placing the hex wrench along the length of the channel 80. In other embodiments, the pivot pin 2 omits the removal aperture 98 and, in some embodiments, has a retention recess in place of the removal aperture 98, similar to that of the retention recess 94.

As shown in FIG. 10, a second embodiment of a pivot pin 4 is configured to be used with the takedown pin 6 and to couple the lower receiver and the upper receiver 10 to each other in a generally similar manner as the pivot pin 2. The pivot pin 4 has features, elements, and configurations that are discussed above with respect to the pivot pin 2 and are thus not re-labeled in the drawings or discussed here, and the disclosure herein with respect to the pivot pin 2 is incorporated herein by reference with respect to the pivot pin 4.

Similar to the pivot pin 2, the shaft 112 of the pivot pin 4 as shown in FIGS. 10-16 defines an installation aperture 114 that extends entirely through the shaft 112 of the pin 2 and that is configured to receive the tool 93 (see FIG. 1), such as a hex wrench having an outer diameter no greater than the inner diameter 116 of the aperture 114 (see FIGS. 12 and 13) and a portion with a length at least as long as that of the aperture 114, thereby urging the retention detent 66 into the detent recess 76. Accordingly, the pivot pin 4 facilitates installation of the pin 4 without using the pivot pin 4 to initially compress the spring 70 and detent 66 into the detent recess 76. Also accordingly, unlike the pivot pin of Huang, the pivot pin 4 enables translating the pin 4 in the aperture 38 of the lower receiver 8 while the tool 93 urges the detent 66 into the detent recess 76 in the lower receiver 8 without applying significant force in the direction of the longitudinal axis of the pin 4 to cause the detent 66 to jump out of a stabilizing recess and translate along the longitudinal axis of the detent 66. The pivot pin 4 therefore simplifies the installation process.

In some embodiments, the installation aperture 114 is configured to prevent at least the detent 66 from passing through the aperture 114 and thus has an inner diameter 116 (see FIGS. 12 and 13) that is smaller than the outer diameter of the detent 66. In some embodiments, the installation aperture 114 has a rim 118 with a countersunk or counterbored shape that is configured to retain the detent 66 in the installation aperture 114 while the pivot pin 4 covers the detent recess 76 in the lower receiver 8 during installation until the tool 93 urges the detent into the detent recess 76. In some embodiments, the rim 118 has a counterbored shape that lacks a ramp surface and does not directly couple with the outer circumferential or intermediary surface 119 of the pivot pin 4, which prevents the detent 66 from escaping the installation aperture 114 until the detent 66 is urged into the detent recess 76 by the tool 93, which is the opposite of the countersunk or ramped recess of Huang, which is intended to promote sliding the detent out of such recess during installation without a tool. Accordingly, in some embodiments, the pivot pin 4 facilitates increased control over the detent 66 during installation of the pivot pin 4.

In some embodiments, a user inserts the spring 70 into the detent recess 76 in the lower receiver, places the detent 66 in the counterbored-shaped end of the installation aperture 114 in the pivot pin 4, covers the detent recess 76 with the pivot pin 4 while introducing the detent 66 in the installation aperture 114 to the detent recess 76, and then compresses the spring 70 and thereby inserting the detent 66 into the detent recess 76 by pressing the tool through the installation aperture 114 and against the front end portion of the detent 66 to urge the detent into the detent recess 76. The user then slides the pivot pin 4 in the aperture 38 toward the left side of the lower receiver 8 as discussed above regarding the pivot pin 2 until the detent 66 no longer aligns with the installation aperture 114, at which point the user removes the tool from the installation aperture 114.

As used herein, the following terms take the meanings explicitly associated herein, unless the context clearly dictates otherwise. The terms "front," "forward," "rear," "rearward," "left," "leftward," "right," and "rightward" are defined relative to the lower receiver 8. The terms "front" and "forward" indicate the direction in which a projectile exits the firearm when assembled and properly discharged or fired. The terms "rear" and "rearward" indicate the opposite direction as front or forward and thus indicate the direction toward the butt or stock of the firearm from the barrel. The terms "height," "vertical," "upper," "lower," "above," "below," "top," "bottom," "topmost," and "bottom-most" are defined relative to vertical axis of the lower receiver 8. The vertical axis is non-parallel to the longitudinal axis of the lower receiver 8 and is defined as parallel to the direction of the earth's gravity force on the lower receiver 8 when the firearm is fully assembled and the barrel is horizontal. The term "lateral" is defined relative to the lateral axis of the lower receiver 8. The lateral axis is non-parallel to the longitudinal and vertical axes. The longitudinal axis of the lower receiver 8 is parallel to the direction that the projectile exits the firearm when assembled and properly discharged or fired.

The term "configured" as used herein means an element being one or more of sized, dimensioned, positioned, or oriented to achieve or provide the recited function or result.

The term "directly coupled" as used herein means that a component contacts (for example, when bolted) or is welded to another component. The term "indirectly coupled" as used herein means that a first component is coupled to a second component by way of one or more intervening components that are coupled to the first and second components. For example, a first component that is indirectly coupled to a second component is directly coupled to a third component, which may be directly coupled to the second component or to a fourth component that is directly coupled to the second component. The term "coupled" should therefore be understood to disclose both direct and indirect coupling of components or elements that are described as being coupled to each other.

The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" as used herein is not exclusive and allows for being based on additional factors not described. The articles "a," "an," and "the" include plural references. Plural references are intended to also disclose the singular.

While the preferred embodiment of the invention has been illustrated and described, as noted above, many changes can be made without departing from the spirit and scope of the invention. For example, each disclosure of a component preferably having a feature or characteristic is intended to also disclose the component as being devoid of that feature or characteristic, unless the principles of the invention clearly dictate otherwise. Accordingly, the scope of the invention is not limited by the disclosure of the preferred embodiment. Instead, the invention should be determined entirely by reference to the claims that follow. It should also be noted that the claim dependencies or combinations of elements recited in the claims does not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (for example, "The apparatus or method of any one of the preceding or subsequent claims . . . "). This disclosure is also intended to disclose the subject matter of any one of the dependent claims, as if it was an independent claim, with or without all or a portion of the subject matter of the original independent claim(s) or any other subject matter disclosed herein.

The invention claimed is:

1. A pivot pin for a coupling an upper receiver of a firearm to a lower receiver of the firearm, the pivot pin comprising: a head; and a shaft that extends from the head, the shaft defining a detent-retention channel that extends along a first side the shaft, the installation aperture is spaced apart from the channel, the shaft defining an installation aperture opposite the channel from the head and extending through the first side of the shaft, the channel being configured to receive a detent and to enable the pivot pin to slide relative to the detent in the channel between a locked configuration and an unlocked configuration, the installation aperture being configured to receive a tool that extends through the shaft and to enable the detent to be urged by the tool into a detent recess in the lower receiver while the shaft covers the detent recess in the lower receiver and while the tool extends through the shaft, whereby the installation aperture in the shaft facilitates reducing a likelihood that the detent escapes from the detent recess in the lower receiver during installation of the pivot pin in the lower receiver.

2. The pivot pin of claim 1, wherein the installation aperture has an inner diameter that is at least as large as an outer diameter of the detent, the installation aperture being configured to enable insertion of the detent into the detent recess in the lower receiver while the pivot pin covers the detent recess in the lower receiver by inserting the detent through the installation aperture in the shaft of the pivot pin, whereby the installation aperture facilitates installation of the pivot pin in the lower receiver without using the pivot pin to overcome a bias of a spring in the detent recess in the lower receiver.

3. The pivot pin of claim 1, wherein the installation aperture has an inner diameter that is smaller than an outer diameter of the detent.

4. The pivot pin of claim 3, wherein the installation aperture has a retention portion with a diameter at least as great as the outer diameter of the detent, the retention portion being configured to retain the detent in the installation aperture while the pivot pin covers the detent recess in the lower receiver during installation of the pivot pin until the tool urges the detent into the detent recess in the lower receiver, whereby the installation aperture in the shaft facilitates increased control over the detent during installation of the pivot pin.

5. The pivot pin of claim 1, wherein the channel has a proximate end portion proximate to the head and a distal end portion distal to the head, the shaft defining a removal aperture in the distal end portion of the channel, the removal aperture being configured to receive the tool that extends through the shaft and to enable the detent to be urged by the tool out of the channel while the tool extends through the shaft, the removal aperture having an inner diameter that is smaller than an outer diameter of the detent, whereby the removal aperture facilitates preventing the detent from escaping the channel until the tool is inserted through the removal aperture.

6. The pivot pin of claim 5, wherein the installation aperture has an inner diameter that is greater than the inner diameter of the removal aperture.

7. The pivot pin of claim 5, wherein the installation aperture has an inner diameter that is substantially the same as the inner diameter of the removal aperture.

8. The pivot pin of claim 5, wherein the shaft defines a main floor of the channel and a ramp coupled to the main floor of the channel and to the removal aperture, the main floor of the channel extending from the proximate end portion of the channel to the distal end portion of the channel, whereby the ramp facilitates transitioning the pivot pin relative to the detent from the unlocked configuration to the locked configuration with reduced force applied to the pivot pin.

9. The pivot pin of claim 8, wherein the pivot pin defines a detent-retention recess in the proximate end portion of the channel and a ramp coupled to the main floor of the channel and to the detent-retention recess, whereby the ramp facilitates transitioning the pivot pin relative to the detent from the locked configuration to the unlocked configuration with reduced force applied to the pivot pin.

10. A pin, comprising:
a head; and
a shaft that extends from the head, the shaft defining a detent-retention channel that extends along the shaft, the shaft defining an installation aperture opposite the channel from the head, the channel being configured to receive a detent and to enable the pin to slide relative to the detent in the channel between a locked configuration and an unlocked configuration, the installation aperture extending entirely through the shaft,
wherein the installation aperture has an inner diameter that is smaller than an outer diameter of the detent and at least as large as an outer diameter of a tool,
whereby the installation aperture in the shaft facilitates simplifying installation of the pin.

11. The pin of claim 10, wherein the installation aperture has a retention portion with a diameter at least as great as the outer diameter of the detent, the retention portion being configured to retain the detent in the installation aperture while the pin covers the recess until the tool urges the detent into the recess, whereby the installation aperture in the shaft facilitates increased control over the detent.

12. The pin of claim 10, wherein the channel has a proximate end portion proximate to the head and a distal end portion distal to the head, the shaft defining a removal aperture in the distal end portion of the channel, the removal aperture being configured to receive a tool that extends through the shaft to urge the detent out of the channel, the removal aperture having an inner diameter that is smaller than an outer diameter of the detent, whereby the removal aperture facilitates preventing the detent from escaping the channel until the tool is inserted through the removal aperture.

13. The pin of claim 12, wherein the inner diameter of the installation aperture is greater than the inner diameter of the removal aperture.

14. The pin of claim 12, wherein the inner diameter of the installation aperture is substantially the same as the inner diameter of the removal aperture.

15. The pin of claim 12, wherein the shaft defines a main floor of the channel and a ramp coupled to the main floor of the channel and to the removal aperture, the main floor of the channel extending from the proximate end portion of the channel to the distal end portion of the channel, whereby the ramp facilitates transitioning the pin relative to the detent from the unlocked configuration to the locked configuration with reduced force applied to the pin.

16. A method of installing a pivot pin in a lower receiver of a firearm, the method comprising:
providing the pivot pin of claim 1;
holding the pivot pin against a front end portion of the lower receiver, the front end portion of the lower receiver defining a detent recess and a pin aperture;
while the pivot pin covers the detent recess in the lower receiver, urging a detent into the detent recess in the lower receiver by inserting a tool through the installation aperture in the shaft of the pivot pin; and
after the detent is urged into the detent recess in the lower receiver, sliding the pivot pin in the pin aperture,
whereby urging the detent into the detent recess in the lower receiver with the tool inserted through the installation aperture in the shaft of the pivot pin facilitates reducing a likelihood that the detent escapes from the detent recess in the lower receiver while holding the pivot pin against the front end portion of the lower receiver.

17. The method of claim 16, further comprising, while the pivot pin covers the detent recess in the lower receiver, inserting the detent through the installation aperture in the shaft of the pivot pin toward the detent recess in the lower receiver, whereby the pivot pin is installed in the lower receiver without using the pivot pin to overcome a bias of a spring in the detent recess in the lower receiver.

18. The method of claim 16, further comprising:
temporarily retaining the detent in a retention portion of the installation aperture while the pivot pin covers the detent recess in the lower receiver;
while the pivot pin covers the detent recess in the lower receiver, urging the detent out of the retention portion of the installation aperture into the detent recess in the lower receiver by inserting the tool through the installation aperture in the shaft of the pivot pin, the installation aperture having an inner diameter that is smaller than an outer diameter of the detent, the retention portion of the installation aperture having a diameter that is at least as great as the outer diameter of the detent,
whereby the installation aperture in the shaft of the pivot pin facilitates increased control over the detent during installation of the pivot pin.

19. A pivot pin for a coupling an upper receiver of a firearm to a lower receiver of the firearm, the pivot pin comprising:
a head; and
a shaft that extends from the head, the shaft defining a detent-retention channel that extends along the shaft, the shaft defining an installation aperture opposite the channel from the head, the channel being configured to receive a detent and to enable the pivot pin to slide relative to the detent in the channel between a locked configuration and an unlocked configuration, the installation aperture being configured to receive a tool that extends through the shaft and to enable the detent to be urged by the tool into a detent recess in the lower receiver while the shaft covers the detent recess in the lower receiver and while the tool extends through the shaft,
wherein the installation aperture has an inner diameter that is smaller than an outer diameter of the detent,
whereby the installation aperture in the shaft facilitates reducing a likelihood that the detent escapes from the detent recess in the lower receiver during installation of the pivot pin in the lower receiver.

\* \* \* \* \*